(12) United States Patent
Gerster et al.

(10) Patent No.: US 9,051,448 B2
(45) Date of Patent: Jun. 9, 2015

(54) STABILIZATION OF ORGANIC MATERIALS

(75) Inventors: Michèle Gerster, Binningen (CH); Dietmar Mäder, Oberursel (DE); Bruno Rotzinger, Delémont (CH)

(73) Assignee: BASF SE, Ludwigshafen (DE)

( * ) Notice: Subject to any disclaimer, the term of this patent is extended or adjusted under 35 U.S.C. 154(b) by 1226 days.

(21) Appl. No.: 11/661,027

(22) PCT Filed: Aug. 22, 2005

(86) PCT No.: PCT/EP2005/054113
§ 371 (c)(1),
(2), (4) Date: Jan. 16, 2008

(87) PCT Pub. No.: WO2006/024611
PCT Pub. Date: Mar. 9, 2006

(65) Prior Publication Data
US 2008/0269382 A1 Oct. 30, 2008

(30) Foreign Application Priority Data
Aug. 31, 2004 (EP) .................................. 04104160

(51) Int. Cl.
*C08K 5/315* (2006.01)
*C08K 5/12* (2006.01)
*C08K 5/3415* (2006.01)
*C08K 5/41* (2006.01)

(52) U.S. Cl.
CPC . *C08K 5/315* (2013.01); *C08K 5/12* (2013.01); *C08K 5/3415* (2013.01); *C08K 5/41* (2013.01)

(58) Field of Classification Search
CPC ....................................................... C08K 5/315
USPC ................................................ 252/399, 407
See application file for complete search history.

(56) References Cited

U.S. PATENT DOCUMENTS

| 4,021,404 | A |   | 5/1977 | Cox |
|---|---|---|---|---|
| 4,105,715 | A | * | 8/1978 | Gleave .......................... 525/276 |
| 4,450,248 | A | * | 5/1984 | Leistner et al. ................. 524/99 |
| 5,516,920 | A |   | 5/1996 | Nesvadba et al. ............. 549/307 |

FOREIGN PATENT DOCUMENTS

| DE | 3317356 |   |   | 11/1983 |
|---|---|---|---|---|
| GB | 1037169 | A |   | 7/1966 |
| GB | 1396313 |   | * | 6/1975 |
| GB | 2039492 | A | * | 8/1980 |
| JP | 43012003 |   |   | 5/1968 |
| JP | 48-37445 |   |   | 6/1973 |
| JP | 52043850 | A |   | 4/1977 |
| WO | 80/01566 |   |   | 8/1980 |
| WO | 03082819 | A1 |   | 10/2003 |

OTHER PUBLICATIONS

English translation of JP 48-37445, 1973.*
English language abstract for DE 3317356, Nov. 1983.
Derwent Abstr. 1974-40500V [25] for JP 48037445, Jun. 1973.
English language abstract of WO03082819 Oct. 9, 2003.

* cited by examiner

*Primary Examiner* — Peter F Godenschwager
(74) *Attorney, Agent, or Firm* — Oblon, McClelland, Maier & Neustadt, L.L.P.

(57) ABSTRACT

The invention describes a process for stabilizing an organic material against oxidative, thermal or light-induced degradation, which comprises incorporating therein or applying thereto at least a compound of the formula (I) wherein the general symbols are as defined in claim 1. The compounds of the formula I are especially useful as processing stabilizers for synthetic polymers.

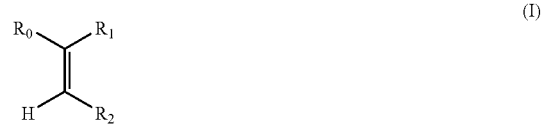

17 Claims, No Drawings

STABILIZATION OF ORGANIC MATERIALS

The present invention relates to a process for stabilizing an organic material, preferably a synthetic polymer, against oxidative, thermal or light-induced degradation, preferably during extrusion of the synthetic polymer, which comprises incorporating therein or applying thereto at least an olefin derivative, as well as to the use thereof for stabilizing organic materials against oxidative, thermal or light-induced degradation. The present invention further relates to new olefin derivatives and therefore also to new compositions comprising them in organic materials which are susceptible to oxidative, thermal or light-induced degradation.

The use of some 3-phenyl-3H-benzofuran-2-ones as stabilizers for organic polymers is disclosed, inter alia in WO-A-80/01566 and U.S. Pat. No. 5,516,920.

The known stabilizers do not satisfy in every respect the high requirements which a stabilizer is required to meet, especially with regard to shelf life, water absorption, sensitivity to hydrolysis, in-process stabilization, color properties, volatility, migration behavior and compatibility. As a result there continues to be a need for effective stabilizers for organic materials that are sensitive to oxidative, thermal and/or light-induced degradation.

It has now been found that a selected group of olefin derivatives is particularly suitable for use as stabilizers for organic materials that are susceptible to oxidative, thermal or light-induced degradation.

Accordingly, the invention relates to a process for stabilizing an organic material against oxidative, thermal or light-induced degradation, which comprises incorporating therein or applying thereto at least a compound of the formula I

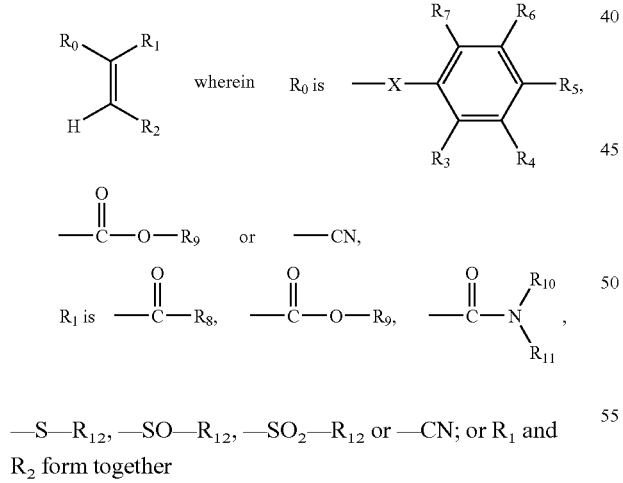

$R_2$ is hydrogen, —S—$R_{13}$, —SO—$R_{13}$, —SO$_2$—$R_{13}$, unsubstituted or $C_1$-$C_4$alkyl substituted phenyl;

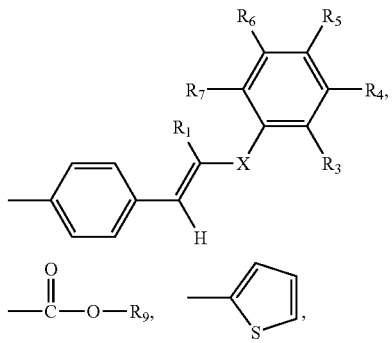

hydroxy or $C_1$-$C_{25}$alkanoyloxy, $R_3$, $R_4$, $R_5$, $R_6$ and $R_7$ independently of each other is hydrogen, $C_1$-$C_{25}$alkyl, halogen, trifluormethyl, nitro, $C_1$-$C_{25}$alkoxy,

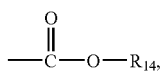

$C_7$-$C_9$phenylalkyl, phenyl or

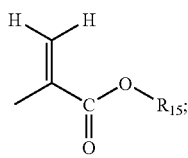

or
each pair of substituent $R_3$ and $R_4$ or $R_4$ and $R_5$ or $R_5$ and $R_6$ or $R_6$ and $R_7$, together with the linking carbon atoms, forms a benzene ring; and with the proviso that at least one of the radicals from the group of $R_3$ to $R_7$ is hydrogen;

$R_8$ is hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl;

$R_9$ is hydrogen, alkali metal, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; $C_3$-$C_{25}$alkyl which is interrupted by oxygen or sulfur;

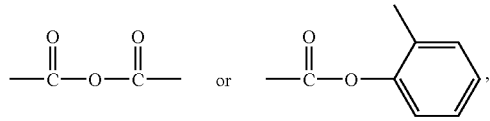

benzhydryl or

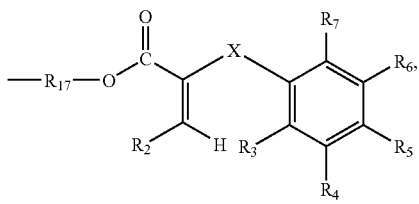

$R_{10}$ and $R_{11}$ independently of one another are hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$alkyl or is interrupted by oxygen, sulfur or

$R_{12}$ is hydrogen, $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{13}$ is hydrogen, $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{14}$ is $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{15}$ is $C_1$-$C_{25}$alkyl or $C_7$-$C_9$phenylalkyl, $R_{16}$ is

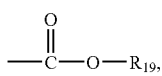

halogen or nitro, $R_{17}$ is $C_2$-$C_{18}$alkylene, $C_4$-$C_{18}$alkylene which is interrupted by oxygen, sulfur or

$C_2$-$C_{18}$alkenylene, $C_2$-$C_{20}$alkylidene, $C_7$-$C_{20}$phenylalkylidene, $C_5$-$C_8$cycloalkylene, $C_7$-$C_8$bicycloalkylene, unsubstituted or $C_1$-$C_4$alkyl-substituted phenylene;

$R_{18}$ is hydrogen, $C_1$-$C_8$alkyl or benzyl, $R_{19}$ is $C_1$-$C_{25}$alkyl or $C_7$-$C_9$phenylalkyl, and X is a direct bond, —SO— or —SO$_2$—.

$C_1$-$C_4$Alkyl-substituted phenyl, which preferably contains 1 to 3, especially 1 or 2 alkyl groups, is, for example, o-, m- or p-methylphenyl, 2,3-dimethylphenyl, 2,4-dimethylphenyl, 2,5-dimethyl phenyl, 2,6-dimethyl phenyl, 3,4-dimethyl phenyl, 3,5-dimethyl phenyl, 2-methyl-6-ethylphenyl, 4-tert-butylphenyl, 2-ethylphenyl or 2,6-diethylphenyl.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl.

Halogen substituents are for example fluoro, chloro, bromo or iodo. Chloro is preferred.

Alkoxy having up to 15 carbon atoms is a branched or unbranched radical, for example methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Preference is given to alkoxy having 1 to 18, especially 1 to 12, for example 1 to 6 carbon atoms.

$C_7$-$C_9$Phenylalkyl is, for example, benzyl, α-methylbenzyl, α,α-dimethylbenzyl or 2-phenylethyl.

Unsubstituted or $C_1$-$C_4$alkyl-substituted $C_5$-$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Preference is given to cyclohexyl and tert-butylcyclohexyl.

$C_3$-$C_{25}$Alkyl interrupted by oxygen or sulfur is, for example, CH$_3$—O—CH$_2$CH$_2$—, CH$_3$—S—CH$_2$CH$_2$—, CH$_3$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— or CH$_3$—(O—CH$_2$CH$_2$—)$_4$O—CH$_2$CH$_2$—.

Where $R_{10}$ and $R_{11}$ together with the nitrogen atom to which they are attached, form a 5-, 6- or 7-membered heterocyclic ring which is unsubstituted or is substituted by $C_1$-$C_4$alkyl or is interrupted by oxygen, sulfur or

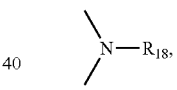

this denotes, for example, the following radicals:

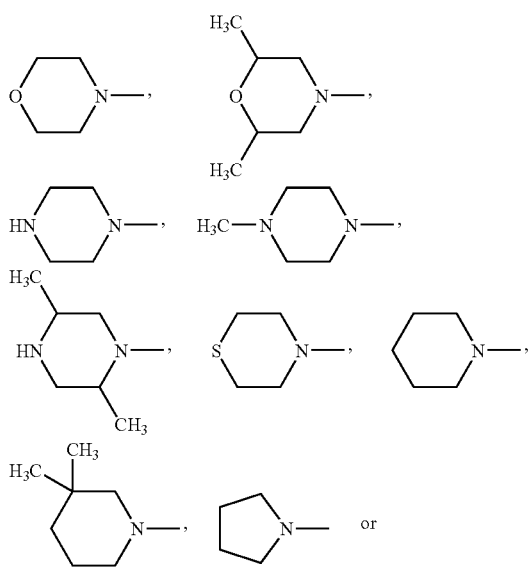

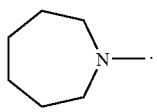

$R_{10}$ and $R_{11}$ preferably form with the nitrogen atom to which they are attached, a 5- or 6-membered heterocyclic ring.

$C_2$-$C_{18}$Alkylene is a branched or unbranched radical, for example ethylene, propylene, trimethylene, tetramethylene, pentamethylene, hexamethylene, heptamethylene, octamethylene, decamethylene, dodecamethylene or octadecamethylene.

$C_4$-$C_{18}$Alkylene which is interrupted by oxygen, sulfur or

is, for example, —CH$_2$CH$_2$—O—CH$_2$CH$_2$—, —CH$_2$CH$_2$—S—CH$_2$CH$_2$—, —CH$_2$CH$_2$—NH—CH$_2$CH$_2$—, —CH$_2$CH$_2$—N(CH$_3$)—CH$_2$CH$_2$—, —CH$_2$CH$_2$—O—CH$_2$CH$_2$—O—CH$_2$CH$_2$—, —CH$_2$CH$_2$—(O—CH$_2$CH$_2$—)$_2$ O—CH$_2$CH$_2$—, —CH$_2$CH$_2$—(O—CH$_2$CH$_2$—)$_3$O—CH$_2$CH$_2$—, —CH$_2$CH$_2$—(O—CH$_2$CH$_2$—)$_4$O—CH$_2$CH$_2$— or —CH$_2$CH$_2$—S—CH$_2$CH$_2$—.

$C_2$-$C_{18}$Alkenylene is, for example, vinylene, methylvinylene, octenylethylene or dodecenylethylene. Preference is given to $C_2$-$C_8$alkenylene.

Alkylidene having 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. Preference is given to $C_2$-$C_8$alkylidene.

Phenylalkylidene having 7 to 20 carbon atoms is, for example, benzylidene, 2-phenylethylidene or 1-phenyl-2-hexylidene. Preference is given to $C_7$-$C_9$phenylalkylidene.

$C_5$-$C_8$Cycloalkylene is a saturated hydrocarbon group having two free valencies and at least one ring unit and is, for example, cyclopentylene, cyclohexylene, cycloheptylene or cyclooctylene. Preference is given to cyclohexylene.

$C_7$-$C_8$Bicycloalkylene is, for example, bicycloheptylene or bicyclooctylene.

Unsubstituted or $C_1$-$C_4$alkyl-substituted phenylene is, for example, 1,2-, 1,3-, 1,4-phenylene. 1,4-Phenylene is preferred.

Also of interest is a process which comprises a compound of the formula I wherein

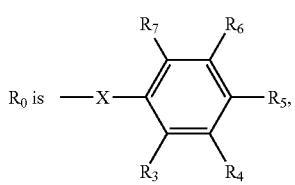

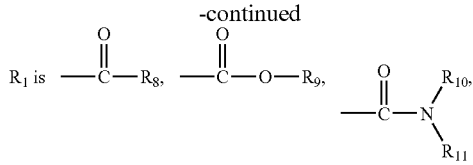

—S—$R_{12}$, —SO—$R_{12}$, —SO$_2$—$R_{12}$ or —CN; or $R_1$ and $R_2$ form together

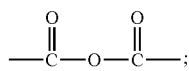

$R_2$ is hydrogen, —S—$R_{13}$, —SO—$R_{13}$, —SO$_2$—$R_{13}$, unsubstituted or $C_1$-$C_4$alkyl substituted phenyl; or

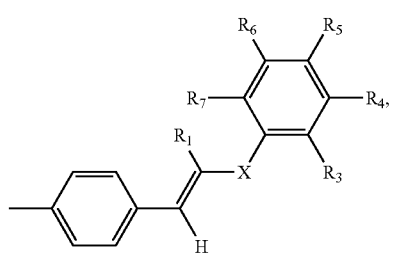

$R_3$, $R_4$, $R_5$, $R_6$ and $R_7$ independently of each other is hydrogen, $C_1$-$C_{25}$alkyl, halogen, trifluormethyl, $C_1$-$C_{25}$alkoxy,

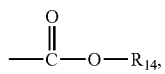

$C_7$-$C_9$phenylalkyl, phenyl or

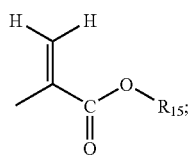

or each pair of substituent $R_3$ and $R_4$ or $R_4$ and $R_5$ or $R_5$ and $R_6$ or $R_6$ and $R_7$, together with the linking carbon atoms, forms a benzene ring; and with the proviso that at least one of the radicals from the group of $R_3$ to $R_7$ is hydrogen;

$R_8$ is hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl;

$R_9$ is hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; $C_3$-$C_{25}$alkyl which is interrupted by oxygen or sulfur;

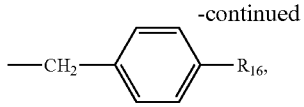

benzhydryl or

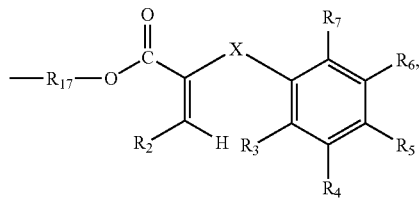

$R_{10}$ and $R_{11}$ independently of one another are hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$alkyl or is interrupted by oxygen, sulfur or

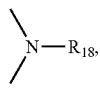

$R_{12}$ is hydrogen, $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{13}$ is hydrogen, $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{14}$ is $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{15}$ is $C_1$-$C_{25}$alkyl or $C_7$-$C_9$phenylalkyl, $R_{16}$ is

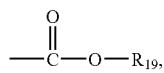

halogen or nitro, $R_{17}$ is $C_2$-$C_{18}$alkylene, $C_4$-$C_{18}$alkylene which is interrupted by oxygen, sulfur or

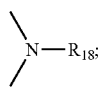

$C_2$-$C_{18}$alkenylene, $C_2$-$C_{20}$alkylidene, $C_7$-$C_{20}$phenylalkylidene, $C_5$-$C_8$cycloalkylene, $C_7$-$C_8$bicycloalkylene, unsubstituted or $C_1$-$C_4$alkyl-substituted phenylene;

$R_{18}$ is hydrogen, $C_1$-$C_8$alkyl or benzyl, $R_{19}$ is $C_1$-$C_{25}$alkyl or $C_7$-$C_9$phenylalkyl, and X is a direct bond, —SO— or —SO$_2$—.

A process of interest comprises a compound of the formula I wherein $R_3$, $R_4$, $R_6$ and $R_7$ are hydrogen.

Also of interest is a process comprising a compound of the formula I wherein $R_5$ is hydrogen, trifluormethyl,

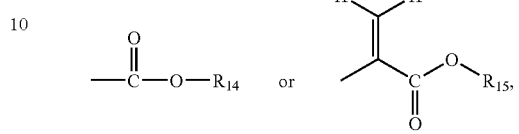

$R_{14}$ is $C_1$-$C_{18}$alkyl, and $R_{15}$ is $C_1$-$C_{18}$alkyl.

Preference is given to a process comprising a compound of the formula I wherein $R_0$ is

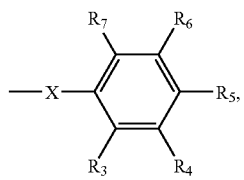

$R_1$ is

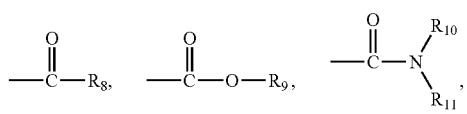

—S—$R_{12}$, —SO—$R_{12}$, —SO$_2$—$R_{12}$ or —CN, $R_2$ is hydrogen, —S—$R_{13}$, —SO—$R_{13}$, —SO$_2$—$R_{13}$, unsubstituted or $C_1$-$C_4$alkyl substituted phenyl; or

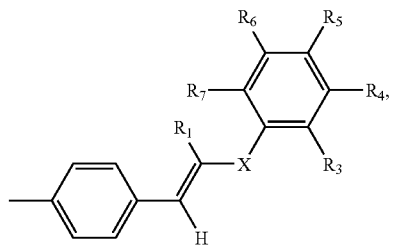

$R_3$, $R_4$, $R_5$, $R_6$ and $R_7$ independently of each other is hydrogen, $C_1$-$C_{18}$alkyl, chloro, bromo, nitro, trifluormethyl, $C_1$-$C_{18}$alkoxy,

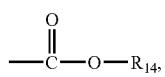

benzyl, phenyl or

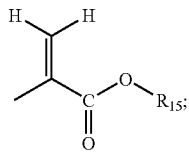

and
with the proviso that at least one of the radicals from the group of $R_3$ to $R_7$ is hydrogen;
$R_8$ is hydrogen, $C_1$-$C_{18}$alkyl, $C_7$-$C_9$phenylalkyl, phenyl or $C_5$-$C_8$cycloalkyl,
$R_9$ is hydrogen, $C_1$-$C_{18}$alkyl, $C_7$-$C_9$phenylalkyl, phenyl, cyclohexyl, $C_3$-$C_{18}$alkyl which is interrupted by oxygen;

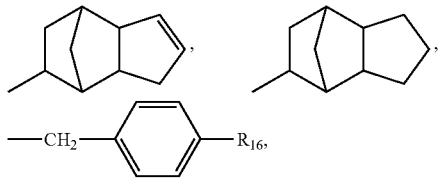

benzhydryl or

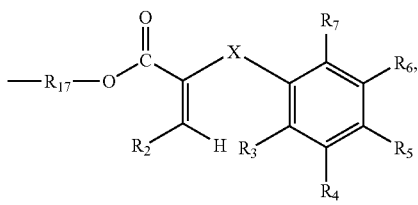

$R_{10}$ and $R_{11}$ independently of one another are hydrogen, $C_1$-$C_{18}$alkyl, $C_7$-$C_9$phenylalkyl, phenyl or $C_5$-$C_8$cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$alkyl;
$R_{12}$ is $C_1$-$C_{18}$alkyl, $C_7$-$C_9$phenylalkyl, phenyl or $C_5$-$C_8$cycloalkyl,
$R_{13}$ is $C_1$-$C_{18}$alkyl, $C_7$-$C_9$phenylalkyl, phenyl or $C_5$-$C_8$cycloalkyl,
$R_{14}$ is $C_1$-$C_{18}$alkyl, benzyl, phenyl or $C_5$-$C_8$cycloalkyl,
$R_{15}$ is $C_1$-$C_{18}$alkyl or benzyl,
$R_{16}$ is

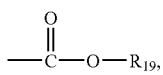

chloro, bromo or nitro,
$R_{17}$ is $C_2$-$C_{18}$alkylene, $C_4$-$C_{18}$alkylene which is interrupted by oxygen or sulfur; $C_2$-$C_{18}$alkenylene, $C_2$-$C_{12}$alkylidene, $C_7$-$C_{20}$phenylalkylidene, $C_5$-$C_8$cycloalkylene, $C_7$-$C_8$bicycloalkylene or phenylene,
$R_{19}$ is $C_1$-$C_{18}$alkyl or benzyl, and
X is a direct bond, —SO— or —$SO_2$—.
Preference is also given to a process comprising a compound of the formula I wherein $R_0$ is

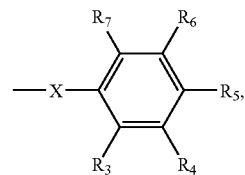

$R_1$ is

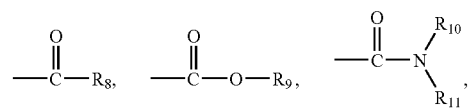

—S—$R_{12}$, —SO—$R_{12}$, —$SO_2$—$R_{12}$ or —CN,
$R_2$ is hydrogen, —S—$R_{13}$, —SO—$R_{13}$, —$SO_2$—$R_{13}$, phenyl or

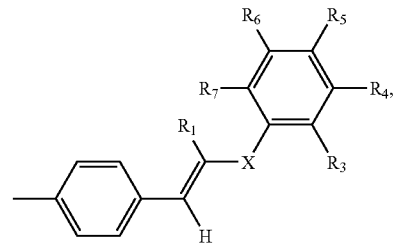

$R_3$, $R_4$, $R_5$, $R_6$ and $R_7$ independently of each other is hydrogen, $C_1$-$C_{12}$alkyl, chloro, nitro trifluormethyl, $C_1$-$C_{12}$alkoxy,

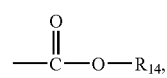

benzyl, phenyl or

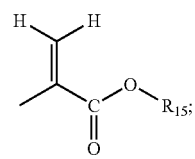

and with the proviso that at least one of the radicals from the group of $R_3$ to $R_7$ is hydrogen;
$R_8$ is $C_1$-$C_{12}$alkyl, benzyl, phenyl or cyclohexyl,
$R_9$ is $C_1$-$C_{18}$alkyl, $C_7$-$C_9$phenylalkyl, phenyl, cyclohexyl, $C_4$-$C_{12}$alkyl which is interrupted by oxygen;

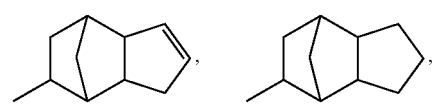

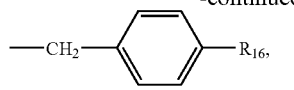

benzhydryl or

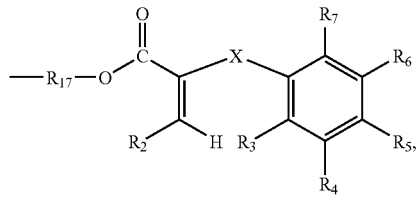

$R_{10}$ and $R_{11}$ independently of one another are hydrogen, $C_2$-$C_{12}$alkyl, benzyl or cyclohexyl; or $R_{10}$ and $R_{11}$, together with the nitrogen atom to which they are attached, form a 5-, 6- or 7-membered heterocyclic ring;

$R_{12}$ is $C_1$-$C_{12}$alkyl, benzyl, phenyl or cyclohexyl, $R_{13}$ is $C_1$-$C_{12}$alkyl, benzyl, phenyl or cyclohexyl, $R_{14}$ is $C_1$-$C_{12}$alkyl, benzyl, phenyl or cyclohexyl, $R_{15}$ is $C_1$-$C_{12}$alkyl or benzyl, $R_{16}$ is

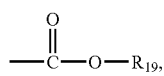

chloro or nitro, $R_{17}$ is $C_2$-$C_{12}$alkylene, $C_4$-$C_{18}$alkylene which is interrupted by oxygen; $C_2$-$C_{12}$alkenylene, $C_2$-$C_{12}$alkylidene, $C_5$-$C_8$cycloalkylene or phenylene, $R_{19}$ is $C_1$-$C_{12}$alkyl or benzyl, and X is a direct bond, —SO— or —SO$_2$—.

Preference is likewise given to a process comprising a compound of the formula I wherein $R_0$ is

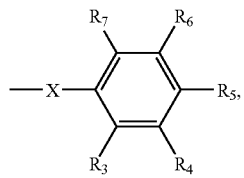

$R_1$ is

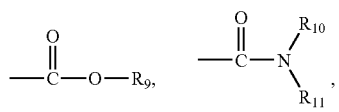

—S—$R_{12}$, —SO—$R_{12}$, —SO$_2$—$R_{12}$ or —CN, $R_2$ is hydrogen, —S—$R_{13}$, —SO—$R_{13}$, —SO$_2$—$R_{13}$, phenyl or

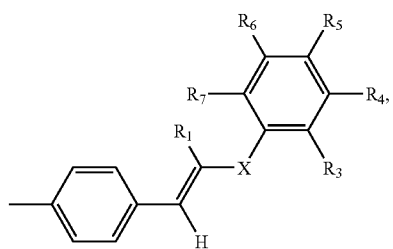

$R_3$, $R_4$, $R_5$, $R_6$ and $R_7$ independently of each other is hydrogen, $C_1$-$C_8$alkyl, trifluormethyl, $C_1$-$C_8$alkoxy,

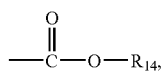

phenyl or

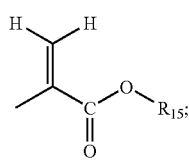

and with the proviso that at least one of the radicals from the group of $R_3$ to $R_7$ is hydrogen;

$R_9$ is $C_1$-$C_{18}$alkyl, $C_7$-$C_9$phenylalkyl, cyclohexyl,

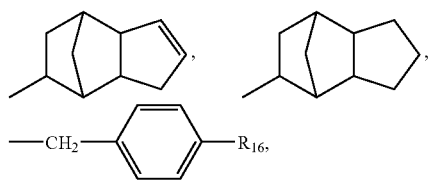

benzhydryl or

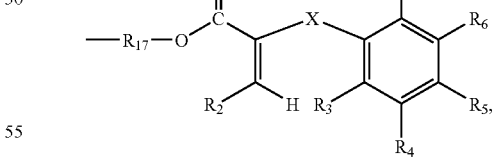

$R_{10}$ and $R_{11}$ independently of one another are hydrogen, $C_2$-$C_{10}$alkyl, benzyl or cyclohexyl; or $R_{10}$ and $R_{11}$, together with the nitrogen atom to which they are attached, form a 5-, 6- or 7-membered heterocyclic ring;

$R_{12}$ is benzyl, phenyl or cyclohexyl, $R_{13}$ is benzyl, phenyl or cyclohexyl, $R_{14}$ is $C_1$-$C_8$alkyl, benzyl or cyclohexyl, $R_{15}$ is $C_1$-$C_8$alkyl or benzyl, $R_{16}$ is

—C(=O)—O—$R_{19}$ or nitro, $R_{17}$ is $C_2$-$C_{12}$alkylene, $C_4$-$C_{12}$alkylene which is interrupted by oxygen; cyclohexylene or phenylene, $R_{19}$ is $C_1$-$C_8$alkyl or benzyl, and X is a direct bond, —SO— or —$SO_2$—.

Particular preference is given to a process comprising a compound of the formula I wherein $R_0$ is

[structure: —X—phenyl with $R_7$, $R_6$, $R_5$, $R_4$, $R_3$ substituents]

$R_1$ is

[structures: —C(=O)—O—$R_9$, —C(=O)—N($R_{10}$)($R_{11}$)]

—S—$R_{12}$, —SO—$R_{12}$, —$SO_2$—$R_{12}$ or —CN, $R_2$ is hydrogen, —SO—$R_{13}$, —$SO_2$—$R_{13}$, phenyl or

[structure: vinyl-linked phenyl group with substituents $R_3$-$R_7$ and X, $R_1$]

$R_3$ is hydrogen, $R_4$ is hydrogen, $R_5$ is hydrogen, trifluormethyl,

[structures: —C(=O)—O—$R_{14}$ or acrylate with $R_{15}$]

$R_6$ is hydrogen, $R_7$ is hydrogen, $R_9$ is $C_1$-$C_{18}$alkyl, benzyl, phenylethyl, cyclohexyl,

[structures: bicyclic norbornene-type group, —$CH_2$—phenyl—$R_{16}$]

benzhydryl or

[structure: —$R_{17}$—O—C(=O)—C(=CH—$R_2$)—X—phenyl with $R_3$-$R_7$]

$R_{10}$ and $R_{11}$, independently of one another are hydrogen, $C_4$-$C_8$alkyl, benzyl or cyclohexyl; or $R_{10}$ and $R_{11}$, together with the nitrogen atom to which they are attached, form a 5- or 6-membered heterocyclic ring, $R_{12}$ is phenyl,
$R_{13}$ is phenyl,
$R_{14}$ is $C_1$-$C_4$alkyl,
$R_{15}$ is $C_1$-$C_4$alkyl,
$R_{16}$ is

—C(=O)—O—$R_{19}$ or nitro, $R_{17}$ is $C_2$-$C_8$alkylene,
$R_{19}$ is $C_1$-$C_4$alkyl, and
X is a direct bond or —SO—.

A lot of the compounds of the formula I are known in the literature. The new compounds of the formula I are prepared in analogy to the known methods for the preparation of the known compounds of the formula I.

The compounds of the formula I are suitable for stabilizing organic materials against oxidative, thermal or light-induced degradation. Examples of such materials are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the precedent paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidenenorbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.

Preferred organic materials are natural, semi-synthetic or, preferably, synthetic polymers.

Particularly referred organic materials are synthetic polymers, most preferably thermoplastic polymers or a lubricant. Especially preferred organic materials are polyacetals, polyolefins such as polypropylene or polyethylene, polyether/polyurethanes or polycarbonates.

To be singled out for special mention is the efficacy of the compounds of the formula I against oxidative or thermal degradation, especially under the action of heat which occurs during the processing, for example extrusion, of thermoplasts. The compounds of the formula I of this invention are therefore admirably suited for use as processing stabilizers.

Of interest is therefore a process comprising a compound of the formula I wherein the stabilization of the organic material takes place during processing of the organic material.

The compounds of the formula I will preferably be added to the organic material to be stabilized in concentrations of from 0.0005 to 10%, preferably 0.001 to 2%, typically 0.01 to 2%, based on the weight of the organic material.

The compound of the formula I are likewise used for polyurethane production, especially for preparing flexible polyurethane foams. In this context the novel process and the products produced therefrom are effectively protected against degradation. In particular, scorching during foam production is avoided.

The polyurethanes are obtained, for example, by reacting polyethers, polyesters and polybutadienes which contain terminal hydroxyl groups with aliphatic or aromatic polyisocyanates.

Polyethers having terminal hydroxyl groups are known and are prepared, for example, by polymerizing epoxides such as ethylene oxide, propylene oxide, butylene oxide, tetrahydrofuran, styrene oxide or epichlorohydrin with themselves, for example in the presence of $BF_3$, or by addition reaction of these epoxides, alone or as a mixture or in succession, with starting components containing reactive hydrogen atoms, such as water, alcohols, ammonia or amines, for example ethylene glycol, propylene 1,3- and 1,2-glycol, trimethylolpropane, 4,4'-dihydroxydiphenylpropane, aniline, ethanolamine or ethylenediamine. Sucrose polyethers are also suitable in accordance with the invention. In many cases preference is given to those polyethers which predominantly (up to 90% by weight, based on all the OH groups present in the polyether) contain primary OH groups. Furthermore, polyethers modified by vinyl polymers, as are formed, for example, by polymerizing styrene and acrylonitrile in the presence of polyethers, are suitable, as are polybutadienes containing OH groups.

These compounds generally have molecular weights of 400-10000 and are polyhydroxy compounds, especially compounds containing from two to eight hydroxyl groups, especially those of molecular weight from 800 to 10 000, preferably from 1000 to 6000, for example polyethers containing at least 2, generally 2 to 8, but preferably 2 to 4, hydroxyl groups, as are known per se for the preparation of homogeneous polyurethanes and cellular polyurethanes.

It is of course possible to employ mixtures of the above compounds containing at least two isocyanate-reactive hydrogen atoms, in particular with a molecular weight of 400-10 000.

Suitable polyisocyanates are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and -1,4-diisocyanate and also any desired mixtures of these isomers, 1-isocyanato-3,3,5-trimethyl-5-isocyanatomethylcyclohexane, 2,4- and 2,6-hexahydrotolylene diisocyanate and also any desired mixtures of these isomers, hexahydro-1,3- and/or -1,4-phenylene diisocyanate, perhydro-2,4'- and/or -4,4'-diphenylmethanediisocyanate, 1,3- and 1,4-phenylene diisocyanate, 2,4- and 2,6-tolylene diisocyanate, and also any desired mixtures of these isomers, diphenylmethane 2,4'- and/or -4,4'-diisocyanate, naphthylene 1,5-diisocyanate, triphenylmethane 4,4',4"-triisocyanate, polyphenyl-polymethylene polyisocyanates as are obtained by aniline-formaldehyde condensation followed by phosgenization, m- and p-isocyanatophenylsulfonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the abovementioned isocyanates with acetals, and polyisocyanates containing polymeric fatty acid radicals.

It is also possible to employ the isocyanate group-containing distillation residues, as they are or dissolved in one or more of the abovementioned polyisocyanates, which are obtained in the course of the industrial preparation of isocyanates. It is additionally possible to use any desired mixtures of the abovementioned polyisocyanates.

Particular preference is given in general to the polyisocyanates which are readily obtainable industrially, for example 2,4- and 2,6-tolylene diisocyanate and any desired mixtures of these isomers ("TDI"), polyphenyl-polymethylene-polyisocyanates as prepared by aniline-formaldehyde condensation followed by phosgenization ("crude MDI"), and polyisocyanates containing carbodiimide, urethane, allophanate, isocyanurate, urea or biuret groups ("modified polyisocyanates").

The compounds of the formula I are also suitable for stabilizing polyolefins which are in long-term contact with extracting media.

In addition to the compounds of the formula the novel process may comprise further costabilizers (additives), typically the following:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutyl phenol, 2,6-dicyclopentyl-4-methyl phenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethyl phenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methyl phenol), 4,4'-thiobis(3,6-di-sec-amyl phenol), 4,4'-bis(2,6-dimethyl-4-hydroxyphenyl) disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-($\alpha$-methylbenzyl)-4-nonylphenol], 2,2'-methylenebis[6-($\alpha,\alpha$-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methyl phenol, 1,1,3-tris(5-tert-butyl-4-hydroxy-2-methyl phenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl phenyl]terephthalate, 1,1-bis-(3, 5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1, 5,5-tetra(5-tert-butyl-4-hydroxy-2-methyl phenyl)pentane.

1.7. O—, N—and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris (3,5-di-tert-butyl-4-hydroxybenzyl)amine, bis(4-tert-butyl-3-hydroxy-2,6-dimethyl benzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecyl mercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methyl benzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenyl methane, 1,2-bis[(2-methyl phenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N N-bis(2,2,6,6-tetramethylpiperid-4-yl-hexamethylenediamine, bis(2,2,6,6-tetramethyl piperid-4-yl)sebacate, 2,2,6,6-tetramethyl piperidin-4-one, 2,2,6,6-tetramethylpiperidin-4-ol.

2. UV Absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenyl benzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-yl phenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butyl phenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzyl malonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2- hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis-(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzyl hydroxylamine, N,N-diethyl hydroxylamine, N,N-dioctylhydroxylamine, N,N-dilaurylhydroxylamine, N,N-ditetradecyl hydroxylamine, N,N-dihexadecylhydroxylamine, N,N-dioctadecyl hydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptyinitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butyl benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl benzofuran-2-one, 3-(3,5-dimethyl-4-pivaloyloxyphenyl)-5,7-di-tert-butyl benzofuran-2-one, 3-(3,4-dimethylphenyl)-5,7-di-tert-butyl benzofuran-2-one, 3-(2,3-dimethylphenyl)-5,7-di-tert-butyl benzofuran-2-one, 3-(2-acetyl-5-isooctyl phenyl)-5-isooctyl benzofuran-2-one.

The costabilizers are added, for example, in concentrations of from 0.01 to 10%, based on the overall weight of the organic material to be stabilized.

The compounds of the formula I can be used in particular together with phenolic antioxidants, light stabilizers and/or processing stabilizers.

Another preferred process comprises, in addition to compounds of the formula I, a compound of the organic phosphite or phosphonite type.

The fillers and reinforcing agents (item 12 in the list), for example talc, calcium carbonate, mica or kaolin, are added to the polyolefin in concentrations, for example, of from 0.01 to 40%, based on the organic material to be stabilized.

A further preferred process comprises in addition to compounds of the formula I further additives as well, especially alkaline earth metal salts of higher fatty acids, for example calcium stearate, calcium lactate and/or calcium stearoyl-2-lactylate.

As a conventional stabilizer combination for the processing of polymeric organic materials, such as, for example, polyolefins, into corresponding moulded articles, the combination of a phenolic antioxidant with a secondary antioxidant based on an organic phosphite or phosphonite is recommended. Depending on the substrate and process, however, many polyolefin processors are obliged to operate processes in the high-temperature range above approx. 280° C. The inclusion of a processing stabilizer of the formula I is particularly suitable for high-temperature applications, especially in the temperature range above 300° C. Technical materials and moulded articles for instance based on HD polyethylene, such as, for example, pipes and their technical variants (fittings), can be manufactured with a higher output and fewer rejects. A further advantage of the compounds of the formula I is also that they can be used in a very small amount, which results in a reduction in the overall antioxidant concentration compared with conventional stabilizer mixtures. For instance the use of a low concentration of a compound of the formula I allows the overall stabilizer concentration to be reduced by approximately a third in, for example, polyolefins, which at the same time represents an economic advantage.

The compounds of the formula I and other optional additives are incorporated into the organic polymeric material according to known methods, for example before or during shaping to moulded articles or alternatively by coating the organic polymeric material with a solution or dispersion of the compounds and subsequently evaporating the solvent. The compounds of the formula I can also be added to the materials to be stabilized in the form of a master batch which contains these compounds, typically in a concentration of, for example, from 2.5 to 25% by weight.

The compounds of the formula I may also be added before or during polymerization or before crosslinking.

In this connection, particular attention is drawn to the surprising feature that the compounds of the formula I inhibit discoloration, especially so-called pinking in the manufacture of e.g. polyurethane foams.

The compounds of the formula I, and where applicable further additives, may be incorporated into the material to be stabilized in pure form or encapsulated in waxes, oils or polymers.

The compounds of the formula I, and where applicable further additives, may also be sprayed onto the polymer to be stabilized. They are able to be used to dilute other additives (e.g. the above-mentioned conventional additives) or melts thereof, so that they can also be sprayed together with these additives onto the polymer to be stabilized. Application by spraying during the deactivation of the polymerization catalysts is especially advantageous, in which case spraying is conveniently effected with the vapour used for deactivation.

The materials stabilized in this way can be employed in a wide variety of forms, for example as films, fibres, tapes, moulding compositions, profiles or as binders for coating materials, especially powder coatings, adhesives or putties.

The polyolefins stabilized in this way can likewise be employed in a wide variety of forms, especially as thick-layer polyolefin mouldings which are in long-term contact with extractive media, such as, for example pipes for liquids or gases, films, geomembranes, tapes, strips, profiles or tanks.

The preferred thick-layer polyolefin mouldings have a layer thickness of from 1 to 50 mm, in particular from 1 to 30 mm, for example from 2 to 10 mm.

Preference is given to a process for stabilizing polyolefins that are in long-term contact with extractive media, wherein the polyolefins are thick-layer polyolefin mouldings and have a layer thickness of from 1 to 50 mm, in particular from 1 to 30 mm, for example from 2 to 10 mm, which comprises incorporating in or applying to said polyolefins at least a compound of the formula I.

Also of particular interest is a process for stabilizing thick-layer polyolefin mouldings that are in long-term contact with extractive media, wherein the thick-layer polyolefin mouldings are pipes or geomembranes, which comprises incorporating in or applying to said mouldings at least a compound of the formula I.

The term geomembranes refers to films which are employed, for example, in landfill sites and are required to have a service life of up to 300 years.

Extractive media are, for example, liquid or gaseous inorganic or organic materials.

Examples of gaseous inorganic materials are oxygen; nitrogen; oxides of nitrogen; for example NO, laughing gas or $NO_2$; oxides of sulfur, for example sulfur dioxide; halogens, for example fluorine or chlorine; Brönstedt acids, for example hydrofluoric acid, hydrochloric acid, hydrobromic acid, hydroiodic acid or hydrocyanic acid; or bases, for example ammonia.

Examples of gaseous organic materials are $C_1$-$C_4$alkanes, for example methane, ethane, propane or butane; carbon monoxide; carbon dioxide; or phosgene.

Examples of liquid inorganic materials are water, chlorinated drinking water or aqueous salt solutions, for example sodium chloride solution (brine) or sodium sulfate solution; bromine; acid halides, e.g. titanium tetrachloride, thionyl chloride, nitrosyl chloride or trimethylsilyl chloride; alkalis, for example aqueous sodium hydroxide (NaOH), aqueous potassium hydroxide (KOH), aqueous ammonia solution, aqueous sodium bicarbonate solution or aqueous sodium carbonate solution.

Examples of liquid organic materials are organic solvents or liquid organic reagents.

Examples of organic solvents are aliphatic hydrocarbons, for example pentane, hexane, heptane, octane, petroleum spirit, nonane or decane; alcohols, for example methanol, ethanol, isopropanol, butanol, pentanol, amyl alcohol, cyclohexanol, pentaerythritol, ethylene glycol, ethylene diglycol, methylcellosolve, polyethylene glycol or glycerol; ketones, for example acetone, diethyl ketone, methyl ethyl ketone, diphenyl ketone or cyclohexanone; ethers, for example diethyl ether, dibutyl ether, tetrahydrofuran or dioxane; aromatic hydrocarbons, for example benzene, toluene or xylene; heterocyclic solvents, for example furan, pyridine, 2,6-lutidine or thiophene; dipolar aprotic solvents, for example dimethylformamide, diethylacetamide or acetonitrile; or surfactants.

For the purposes of the present invention, extractive media are also mixtures and solutions, especially aqueous mixtures, emulsions or solutions, of liquid or gaseous inorganic and organic materials as listed above.

Of particular interest are those extractive media which are important in the chemical industry or in landfill sites.

A preferred embodiment of the present invention is therefore also the use of a compound of the formula I, with or without further additives, for improving the stability of polyolefins that are in long-term contact with extractive media.

The preferred compounds of the formula I for the use as stabilizers are the same as those described for the process for stabilizing an organic material.

The products prepared according to the process of the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows;

seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded or co-extruded plates, glazing for buildings (monolithic, twin or multi-wall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article (product), in particular a film, pipe, profile, bottle, tank or container, fiber prepared by a process as described above.

A further embodiment of the present invention relates to a molded article prepared according to the process as described above. The molding is in particular effected by injection, blow, compression, roto-molding or slush-molding or extrusion.

As already mentioned, the organic materials to be protected are preferably organic, especially synthetic, polymers. In this context, thermoplastic materials are protected with particular advantage. Attention should be drawn above all in this context to the outstanding activity of the stabilizers of the formula I as in-process stabilizers (heat stabilizers). For this purpose they are advantageously added to the polymer prior to or during its processing. However, other polymers too (for example elastomers) or lubricants or hydraulic fluids can be stabilized against degradation, for example light-induced or thermooxidative degradation.

The invention relates also to a process for stabilizing a functional fluid, preferably from the series of lubricants, hydraulic fluids and metal-working fluids and also fuels for powering engines of the 4-stroke, Otto, 2-stroke, diesel, Wankel and orbital types, which comprises incorporating therein at least one compound of the formula I.

The compounds of the formula I may preferably be used in lubricants and fuels as multifunctional stabilizers, that is to say they combine in themselves antioxidative, friction-reducing, extreme-pressure-protection and wear-protection action and also anti-corrosion properties.

Preferred lubricants and fuels and related products are engine oils, turbine oils, gear oils, hydraulic fluids, diesel or Otto fuels, metal-working fluids and lubricating greases.

Especially preferred lubricants are mineral oils, synthetic oils or mixtures thereof.

Products known per se are used as functional fluids from the series of lubricants, hydraulic fluids and metal-working fluids.

The lubricants and hydraulic fluids that come into consideration will be familiar to the person skilled in the art and are described in the relevant specialist literature, such as, for example, in Dieter Klamann, "Schmierstoffe und verwandte Produkte" [Lubricants and related products] (Verlag Chemie, Weinheim, 1982), in Schewe-Kobek, "Das Schmiermittel-Taschenbuch" [The lubricant handbook] (Dr. Alfred Hüthig-Verlag, Heidelberg, 1974) and in "Ullmanns Enzyklopädie der technischen Chemie" [Ullmann's Encyclopaedia of Industrial Chemistry], Vol. 13, pages 85-94 (Verlag Chemie, Weinheim, 1977).

The lubricants are especially oils and greases, for example based on a mineral oil. Oils are preferred.

A further group of lubricants that may be used are vegetable or animal oils, greases, tallows and waxes or mixtures thereof with one another or mixtures with the mentioned mineral or synthetic oils.

Vegetable and animal oils, greases, tallows and waxes are, for example, palm-kernel oil, palm oil, olive oil, rapeseed oil, rape oil, linseed oil, groundnut oil, soybean oil, cottonseed oil, sunflower oil, pumpkin seed oil, coconut oil, maize oil, castor oil, tree nut oil and mixtures thereof, fish oils, tallows obtained from slaughtered animals, such as beef tallow, neatsfoot oil and bone oil, and modified, epoxidised and sulfoxidised forms thereof, for example epoxidised soybean oil.

The mineral oils are based especially on hydrocarbon compounds.

Examples of synthetic lubricants include lubricants based on aliphatic or aromatic carboxy esters, polymeric esters, polyalkylene oxides, phosphoric acid esters, poly-alpha-olefins or silicones, a diester of a divalent acid with a monohydric alcohol, such as, for example, dioctyl sebacate or dinonyl adipate, a triester of trimethylol propane with a monovalent acid or with a mixture of such acids, such as, for example, trimethylolpropane tripelargonate, trimethylolpropane tricaprylate or mixtures thereof, a tetraester of pentaerythritol with a monovalent acid or with a mixture of such acids, such as, for example, pentaerythritol tetracaprylate, or a complex ester of monovalent and divalent acids with polyhydric alcohols, for example a complex ester of trimethylolpropane with caprylic and sebacic acid, or a mixture thereof. Apart from mineral oils there are especially suitable, for example, poly-alpha-olefins, ester-based lubricants, phosphates, glycols, polyglycols and polyalkylene glycols, and also mixtures thereof with water.

Metal-working fluids and hydraulic fluids may be prepared on the basis of the same sub-stances as those described above for the lubricants, such fluids frequently being emulsions of such substances in water or other liquids.

Lubricant and fuel compositions according to the invention are used, for example, in internal combustion engines, e.g. in motorised vehicles equipped with, for example, engines of the Otto, diesel, two-stroke, Wankel or orbital type.

The compounds of the formula I are readily soluble in lubricants and fuels, metal-working fluids and hydraulic fluids and are therefore especially suitable as additives for lubricants and fuels, metal-working fluids and hydraulic fluids.

As additives in lubricants, the compounds of the formula I are effective even in very small amounts. They are mixed in with the lubricants advantageously in an amount of from 0.01 to 5% by weight, preferably in an amount of from 0.05 to 3% by weight and very especially in an amount of from 0.1 to 2% by weight, in each case based on the lubricant.

The compounds of the formula I may be mixed in with the lubricants and fuels in a manner known per se. The compounds of the formula I are readily soluble, for example, in oils. It is also possible to prepare a so-called master batch, which may be diluted, as a function of use, with the appropriate lubricant or fuel to the concentrations suitable for use. In such cases concentrations above 1% by weight are possible.

The lubricants and fuels, metal-working fluids and hydraulic fluids may additionally comprise other additives that are added in order to improve their basic properties still further; such additives include: further antioxidants, metal passivators, rust inhibitors, viscosity index improvers, pour-point depressants, dispersants, detergents, coefficient of friction reducers, further extreme-pressure additives and anti-wear additives. Such further additives are added advantageously in an amount of from 0.01 to 5% by weight.

A number of such compounds can be found, for example, in the above list "1. Antioxidants", especially points 1.1 to 1.19. In addition, further additives may be mentioned by way of example:

Examples of Further Antioxidants

Aliphatic or aromatic phosphites, esters of thiodipropionic acid or thiodiacetic acid or salts of dithiocarbamic or dithiophosphoric acid, 2,2,12,12-tetramethyl-5,9-dihydroxy-3,7, 1'-trithiamidecane and 2,2,15,15-tetramethyl-5,12-dihydroxy-3,7,10,14-tetrathiahexadecane.

Examples of Metal Deactivators, e.g. for Copper, are:

a) Benzotriazoles and derivatives thereof, e.g. 2-mercaptobenzotriazole, 2,5-dimercaptobenzotriazole, 4- or 5-alkylbenzotriazoles (e.g. tolutriazole) and derivatives thereof, 4,5,6,7-tetrahydrobenzotriazole, 5,5'-methylenebis-benzotriazole; Mannich bases of benzotriazole or tolutriazole, such as 1-[di(2-ethylhexyl)aminomethyl]tolutriazole and 1-[di(2-ethylhexyl)aminomethyl]benzotriazole; alkoxyalkylbenzotriazoles, such as 1-(nonyloxymethyl)benzotriazole, 1-(1-butoxyethyl)benzotriazole and 1-(1-cyclohexyloxybutyl)tolutriazole.
b) 1,2,4-Triazoles and derivatives thereof, e.g. 3-alkyl- (or -aryl-)1,2,4-triazoles, Mannich bases of 1,2,4-triazoles, such as 1-[di(2-ethylhexyl)aminomethyl]-1,2,4-triazole; alkoxyalkyl-1,2,4-triazoles, such as 1-(1-butoxyethyl)-1,2,4-triazole; acylated 3-amino-1,2,4-triazoles.
c) imidazole derivatives, e.g. 4,4'-methylenebis(2-undecyl-5-methyl)imidazole and bis[(N-methyl)imidazol-2-yl] carbinol-octyl ether.
d) Sulfur-containing heterocyclic compounds, e.g. 2-mercaptobenzothiazole, 2,5-dimercapto-1,3,4-thiadiazole, 2,5-dimercaptobenzothiadiazole and derivatives thereof; 3,5-bis[di(2-ethyl hexyl)aminomethyl]-1,3,4-thiadiazolin-2-one.
e) Amino compounds, e.g. salicylidene-propylenediamine, salicylaminoguanidine and salts thereof.

Examples of Rust Inhibitors are:
a) Organic acids, their esters, metal salts, amine salts and anhydrides, e.g. alkyl- and alkenyl-succinic acids and their partial esters with alcohols, diols or hydroxycarboxylic acids, partial amides of alkyl- and alkenyl-succinic acids, 4-nonylphenoxyacetic acid, alkoxy- and alkoxyethoxycarboxylic acids, such as dodecyloxyacetic acid, dodecyloxy(ethoxy)acetic acid and amine salts thereof, and also N-oleoyl-sarcosine, sorbitan monooleate, lead naphthenate, alkenylsuccinic acid anhydrides, e.g. dodecenylsuccinic acid anhydride, 2-(2-carboxyethyl)-1-dodecyl-3-methylglycerol and salts thereof, especially sodium and triethanolamine salts thereof.
b) Nitrogen-containing compounds, e.g.:
  i. Primary, secondary or tertiary, aliphatic or cycloaliphatic amines and amine salts of organic and inorganic acids, e.g. oil-soluble alkylammonium carboxylates, and 1-[N,N-bis(2-hydroxyethyl)amino]-3-(4-nonylphenoxy)propan-2-ol.
  ii. Heterocyclic compounds, e.g.: substituted imidazolines and oxazolines, e.g. 2-heptadecenyl-1-(2-hydroxyethyl)-imidazoline.
c) Phosphorus-containing compounds, e.g.:
  Amine salts of phosphoric acid partial esters or phosphonic acid partial esters, zinc dialkyldithiophosphates.
d) Sulfur-containing compounds, e.g.:
  Barium dinonyinaphthalene sulfonates, calcium petroleum sulfonates, alkylthio-substituted aliphatic carboxylic acids, esters of aliphatic 2-sulfocarboxylic acids and salts thereof.
e) Glycerol derivatives, e.g.:
  Glycerol monooleate, 1-(alkylphenoxy)-3-(2-hydroxyethyl)glycerols, 1-(alkylphenoxy)-3-(2,3-dihydroxypropyl)glycerols, 2-carboxyalkyl-1,3-dialkylglycerols.

Examples of Viscosity Index Improvers are:
Polyacrylates, polymethacrylates, vinylpyrrolidone/methacrylate copolymers, polyvinyl pyrrolidones, polybutenes, olefin copolymers, styrene/acrylate copolymers, polyethers.

Examples of Pour-Point Depressants are:
Poly(meth)acrylates, ethylene/vinyl acetate copolymer, alkylpolystyrenes, fumarate copolymers, alkylated naphthalene derivatives.

Examples of Dispersants/Surfactants are:
Polybutenylsuccinic acid amides or imides, polybutenylphosphonic acid derivatives, basic magnesium, calcium and barium sulfonates and phenolates.

Examples of Extreme-Pressure and Anti-Wear Additives are:
Sulfur- and/or phosphorus- and/or halogen-containing compounds, such as, for example, chlorinated paraffins, sulfurated olefins or vegetable oils (soybean/rape oil), alkyl- or aryl-di- or -tri-sulfides, zinc dialkyldithiophosphates, zinc dithiocarbamates such as zinc diamyldithiocarbamate, molybdenum dithioates such as molybdenum dithiocarbamates, triaryl phosphates such as tritolyl phosphate, tricresyl phosphate, phenyl phosphate isopropyl ester, amine salts of mono- or di-alkylphosphoric acids such as the amine salts of mono-/di-hexyl phosphate, amine salts of alkylphosphonic acids such as the amine salt of methylphosphonic acid, triaryl phosphites such as tris[nonylphenyl] phosphite, dialkyl phosphites such as dioctyl phosphite, triaryl monothiophosphates such as triphenyl thionophosphate or tris[isononylphenyl] thionophosphate or tert-butylated triphenyl thionophosphate, substituted tri-alkyl mono- or di-thiophosphates such as diisopropoxyphosphinothioyl)thio]propionate or butylene-1,3-bis[(diisobutoxyphosphinothioyl)propionate, trithiophosphates such as trithiophosphoric acid S,S,S-tris(isooctyl-2-acetates), amine salts of 3-hydroxy-1,3-thiaphosphetane-3-oxide, benzotriazoles or derivatives thereof such as bis(2-ethylhexyl)aminomethyltolutriazole, dithiocarbamates such as methylene-bis-dibutyldithiocarbamate, derivatives of 2-mercaptobenzothiazole such as 1-[N,N-bis(2-ethylhexyl) aminomethyl]-2-mercapto-1H-1,3-benzothiazole, derivatives of 2,5-dimercapto-1,3,4-thiadiazole such as 2,5-bis(tert-nonyldithio)-1,3,4-thiadiazole.

Examples of Coefficient of Friction Reducers are:
Lard oil, oleic acid, tallow, rape oil, sulfurated fats, amines. Further examples are given in EP-A-0 565 487.

Examples of Special Additives for Use in Water/Oil Metal-Working Fluids and Hydraulic Fluids are:
Emulsifiers: petroleum sulfonates, amines, such as polyoxyethylated fatty amines, non-ionic surface-active substances;
Buffers: alkanolamines;
Biocides: triazines, thiazolinones, tris-nitromethane, morpholine, sodium pyridenethol;
Speed improvers: calcium and barium sulfonates;

Examples of Fuel Additives:
Fuel additives are described in Kirk-Othmer, Encyclopedia of Chemical Technology, Vol 12, 1994 and in this instance are essentially petrol and diesel additives:
Petrol: dyes, especially azo dyes;
Antioxidants: aminic, especially para-phenylenediamines, or phenolic, e.g. 2,6-di-tert-butylphenol, as described above;
Metal deactivators: especially N,N'-disalicylidene-1,2-propane, benzotriazole, EDTA;
Rust inhibitors: for example carboxylic acids, sulfonates, amines or amine salts;
Dispersants: e.g. esters, high-molecular-weight amines, Mannich bases, succinimides, borated succinimides;
Detergents: for example fatty acid amides, nonpolymeric amines, polybutene succinimides, polyether amines, low-molecular-weight amines, sulfonates, salicylic acid derivatives;
Demulsifiers: for example long-chain alcohols or phenols containing poly-ethylene or -butylene groups;

Antiknock agents: tetraalkyl lead, manganese methylcyclopentadienyltricarbonyl;

Oxygen compounds: esters of vegetable oils, ethers, alcohols for improving burn behaviour;

Diesel: ignition improvers (cetane improvers), e.g. alkyl nitrates, ether nitrates, alkyl diglycol nitrates, organic peroxides;

Stabilizers for, especially, cracked diesel: amines and other N-containing compounds that act as radical traps.

Especially preferred further additives in lubricants are aminic antioxidants, especially mixtures of mono- and di-alkylated tert-butyl-/tert-octyl-diphenylamines.

The present invention relates also to the use of the components of the formula I for stabilizing organic materials against oxidative, thermal or light-induced degradation, especially as additives in lubricants and fuels, hydraulic fluids or metal-working fluids, preferably in hydraulic oils and gear oils; or as processing stabilizers, especially synthetic polymers. The use according to the invention includes protection of the metal components to be lubricated against mechanical attrition (wear protection) and corrosion protection activity and also antioxidation activity—with respect both to the lubricant and to the metal components.

The present invention also relates to a new compositions comprising a) a synthetic polymer or a lubricant subject to oxidative, thermal or light-induced degradation, and b) at least one compound of the formula I

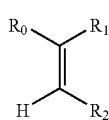 wherein $R_0$ is 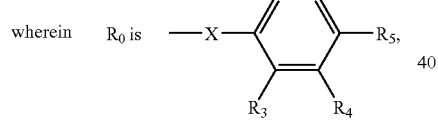

$R_1$ is 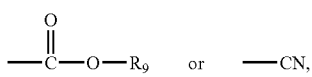

$-S-R_{12}$, $-SO-R_{12}$, $-SO_2-R_{12}$ or $-CN$; or $R_1$ and $R_2$ form together

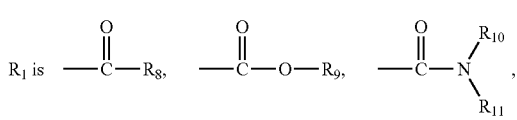

$R_2$ is hydrogen, $-S-R_{13}$, $-SO-R_{13}$, $-SO_2-R_{13}$, unsubstituted or $C_1$-$C_4$alkyl substituted phenyl;

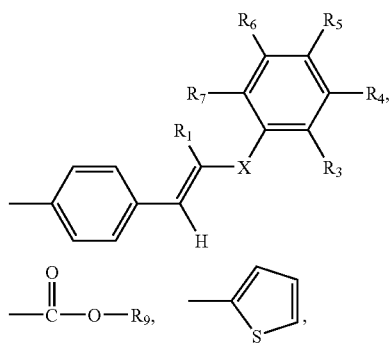

hydroxy or $C_1$-$C_{25}$alkanoyloxy, $R_3$, $R_4$, $R_5$, $R_6$ and $R_7$ independently of each other is hydrogen, $C_1$-$C_{25}$alkyl, halogen, trifluormethyl, nitro, $C_1$-$C_{25}$alkoxy,

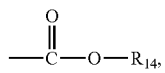

$C_7$-$C_9$phenylalkyl, phenyl or

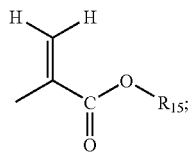

or each pair of substituent $R_3$ and $R_4$ or $R_4$ and $R_5$ or $R_5$ and $R_6$ or $R_6$ and $R_7$, together with the linking carbon atoms, forms a benzene ring; and with the proviso that at least one of the radicals from the group of $R_3$ to $R_7$ is hydrogen;

$R_8$ is hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl;

$R_9$ is hydrogen, alkali metal, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; $C_3$-$C_{25}$alkyl which is interrupted by oxygen or sulfur;

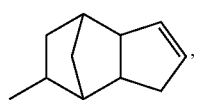 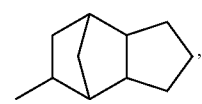

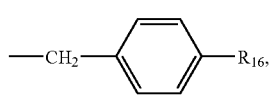

benzhydryl or

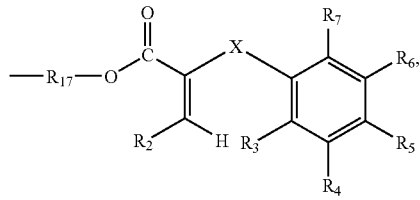

$R_{10}$ and $R_{11}$ independently of one another are hydrogen, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$alkyl or is interrupted by oxygen, sulfur or

$R_{12}$ is hydrogen, $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{13}$ is hydrogen, $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{14}$ is $C_1$-$C_{25}$alkyl, $C_7$-$C_9$phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{15}$ is $C_1$-$C_{25}$alkyl or $C_7$-$C_9$phenylalkyl, $R_{16}$ is

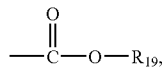

halogen or nitro, $R_{17}$ is $C_2$-$C_{18}$alkylene, $C_4$-$C_{18}$alkylene which is interrupted by oxygen, sulfur or

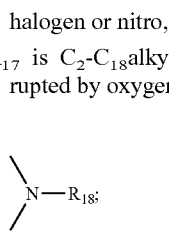

$C_2$-$C_{18}$alkenylene, $C_2$-$C_{20}$alkylidene, $C_7$-$C_{20}$phenylalkylidene, $C_5$-$C_8$cycloalkylene, $C_7$-$C_8$bicycloalkylene, unsubstituted or $C_1$-$C_4$alkyl-substituted phenylene;

$R_{18}$ is hydrogen, $C_1$-$C_8$alkyl or benzyl, $R_{19}$ is $C_1$-$C_{25}$alkyl or $C_7$-$C_9$phenylalkyl, and X is a direct bond, —SO— or —SO$_2$—; with the provisos that the compounds of the formula A, B and C are excluded

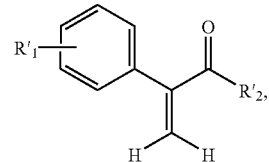

(A)

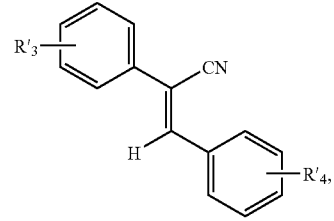

(B)

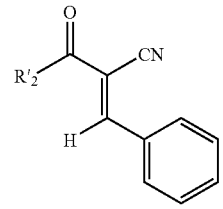

(C)

wherein $R'_1$, is $C_1$-$C_4$alkyl, halogen or trifluoromethyl, $R'_2$ is hydroxy or $C_1$-$C_4$alkoxy, $R'_3$ is halogen, and $R'_4$ is $C_1$-$C_4$alkyl.

The preferred synthetic polymers, lubricants and general symbols are identical to those as disclosed for the process above.

Of very special interest are compositions comprising as component (b) a compound of the formula I, wherein $R_0$ is

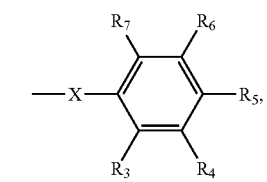

$R_1$ is

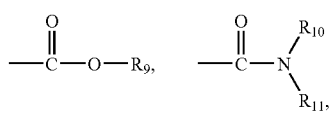

—S—$R_{12}$, —SO—$R_{12}$, —SO$_2$—$R_{12}$ or —CN, $R_2$ is hydrogen, —SO—$R_{13}$, —SO$_2$—$R_{13}$, phenyl or

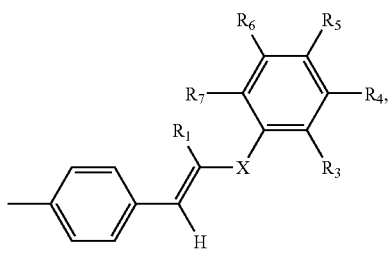

$R_3$ is hydrogen,
$R_4$ is hydrogen,
$R_5$ is hydrogen, trifluormethyl,

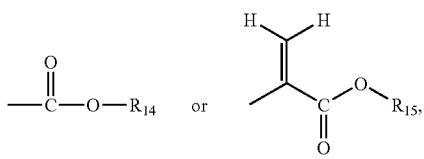

$R_6$ is hydrogen,
$R_7$ is hydrogen,
$R_9$ is $C_1$-$C_{18}$alkyl, benzyl, phenylethyl, cyclohexyl,

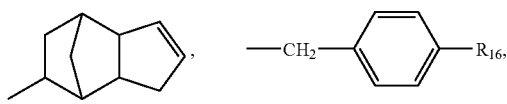

benzhydryl or

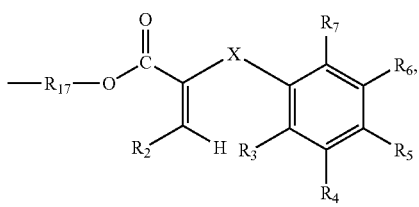

$R_{10}$ and $R_{11}$ independently of one another are hydrogen, $C_4$-$C_8$alkyl, benzyl or cyclohexyl; or
$R_{10}$ and $R_{11}$, together with the nitrogen atom to which they are attached, form a 5- or 6-membered heterocyclic ring,
$R_{12}$ is phenyl,
$R_{13}$ is phenyl,
$R_{14}$ is $C_1$-$C_4$alkyl,
$R_{15}$ is $C_1$-$C_4$alkyl,
$R_{16}$ is

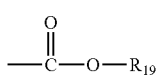

or nitro,
$R_{17}$ is $C_2$-$C_8$alkylene,
$R_{19}$ is $C_1$-$C_4$alkyl, and
X is a direct bond or —SO—; with the provisos that the compounds of the formula A, B and C are excluded

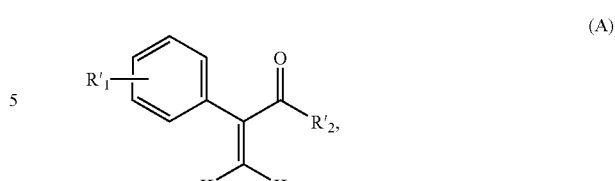

(A)

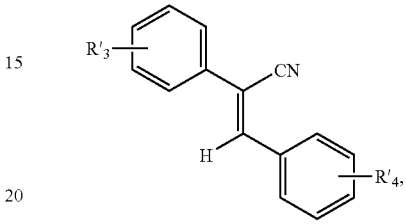

(B)

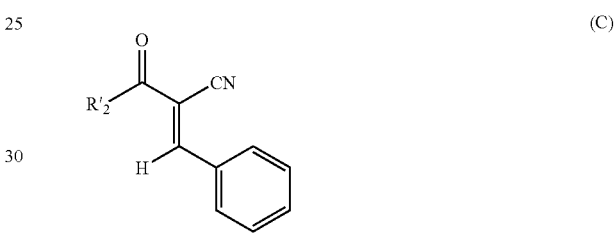

(C)

wherein
$R'_1$ is $C_1$-$C_4$alkyl, halogen or trifluoromethyl,
$R_{12}$ is hydroxy or $C_1$-$C_4$alkoxy,
$R_{13}$ is halogen, and
$R_{14}$ is $C_1$-$C_4$alkyl.

The present invention also relates to a new compounds of the formula I

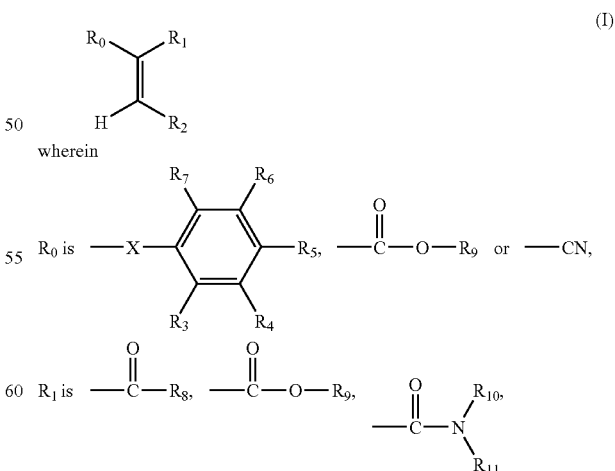

(I)

wherein $R_0$ is —X—[phenyl with $R_3$, $R_4$, $R_5$, $R_6$, $R_7$]—$R_5$, —C(O)—O—$R_9$ or —CN, $R_1$ is —C(O)—$R_8$, —C(O)—O—$R_9$, —C(O)—N($R_{10}$)($R_{11}$),
—S—$R_{12}$, —SO—$R_{12}$, —$SO_2$—$R_{12}$ or —CN;
$R_2$ is hydrogen, —S—$R_{13}$, —SO—$R_{13}$, —$SO_2$—$R_{13}$,

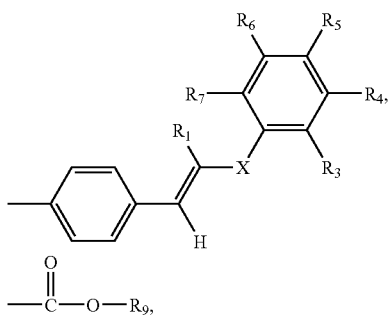

or C$_4$-C$_{25}$alkanoyloxy,

R$_3$, R$_4$, R$_5$, R$_6$ and R$_7$ independently of each other is hydrogen, C$_1$-C$_{25}$alkyl, halogen, trifluormethyl, nitro, C$_1$-C$_{25}$alkoxy,

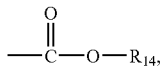

C$_7$-C$_9$phenylalkyl, phenyl or

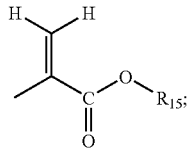

or each pair of substituent R$_3$ and R$_4$ or R$_4$ and R$_5$ or R$_5$ and R$_6$ or R$_6$ and R$_7$, together with the linking carbon atoms, forms a benzene ring; and with the proviso that at least one of the radicals from the group of R$_3$ to R$_7$ is hydrogen;

R$_8$ is hydrogen, C$_1$-C$_{25}$alkyl, C$_7$-C$_9$phenylalkyl, unsubstituted or C$_1$-C$_4$alkyl-substituted phenyl; unsubstituted or C$_1$-C$_4$alkyl-substituted C$_5$-C$_8$cycloalkyl;

R$_9$ is C$_5$-C$_{25}$alkyl, C$_7$-C$_9$phenylalkyl, unsubstituted or C$_1$-C$_4$alkyl-substituted phenyl; unsubstituted or C$_1$-C$_4$alkyl-substituted C$_5$-C$_8$cycloalkyl; C$_3$-C$_{25}$alkyl which is interrupted by oxygen or sulfur;

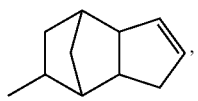 , 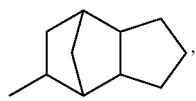 ,

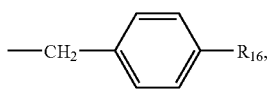

benzhydryl or

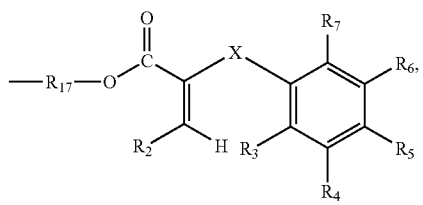

R$_{10}$ and R$_{11}$ independently of one another are C$_4$-C$_{25}$alkyl, C$_7$-C$_9$phenylalkyl, unsubstituted or C$_1$-C$_4$alkyl-substituted C$_5$-C$_8$cycloalkyl; or R$_{10}$ and R$_{11}$, together with the nitrogen atom to which they are attached, form a 5-, 6- or 7-membered heterocyclic ring which is unsubstituted or is substituted by C$_1$-C$_4$alkyl or is interrupted by sulfur or

R$_{12}$ is hydrogen, C$_1$-C$_{25}$alkyl, C$_7$-C$_9$phenylalkyl or unsubstituted or C$_1$-C$_4$alkyl-substituted C$_5$-C$_8$cycloalkyl;

R$_{13}$ is hydrogen, C$_1$-C$_{25}$alkyl, C$_7$-C$_9$phenylalkyl, unsubstituted or C$_1$-C$_4$alkyl-substituted phenyl; or unsubstituted or C$_1$-C$_4$alkyl-substituted C$_5$-C$_8$cycloalkyl;

R$_{14}$ is C$_1$-C$_{25}$alkyl, C$_7$-C$_9$phenylalkyl, unsubstituted or C$_1$-C$_4$alkyl-substituted phenyl; or unsubstituted or C$_1$-C$_4$alkyl-substituted C$_5$-C$_8$cycloalkyl;

R$_{15}$ is C$_1$-C$_{25}$alkyl or C$_7$-C$_9$phenylalkyl,

R$_{16}$ is

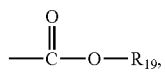

halogen or nitro,

R$_{17}$ is C$_2$-C$_{18}$alkylene, C$_4$-C$_{18}$alkylene which is interrupted by oxygen, sulfur or

C$_2$-C$_{18}$alkenylene, C$_2$-C$_{20}$alkylidene, C$_7$-C$_{20}$phenylalkylidene, C$_5$-C$_8$cycloalkylene, C$_7$-C$_8$bicycloalkylene, unsubstituted or C$_1$-C$_4$alkyl-substituted phenylene;

R$_{18}$ is hydrogen, C$_1$-C$_8$alkyl or benzyl,

R$_{19}$ is C$_1$-C$_{25}$alkyl or C$_7$-C$_9$phenylalkyl, and

X is a direct bond, —SO— or —SO$_2$—.

The preferred general symbols are identical to those as disclosed for the process above.

The examples which follow illustrate the invention in more detail. Parts and percentages are by weight.

EXAMPLE 1

Preparation of 2-phenyl-acrylic Acid Octyl Ester (Compound 101)

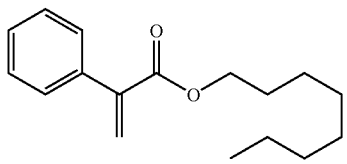

(101)

To a mixture of 49.9 g (300 mmol) of tropic acid and 5.00 g of montmorillonite K10 in 200 ml of toluene is added dropwise at 110° C. 104 g (800 mmol) of 1-octanol. The reaction mixture is stirred for 8 hours, and then toluene/water are removed by azeotropical distillation. The catalyst residue is filtered off and the filtrate is evaporated to dryness to afford 60.4 g (72%) of 3-hydroxy-2-phenyl-propionic acid octyl ester.

To 60.4 g of 3-hydroxy-2-phenyl-propionic acid octyl ester in 150 ml of toluene is added at 4° C. 22.9 g (290 mmol) of pyridine followed by 22.8 g (290 mmol) of acetyl chloride dissolved in 50 ml of toluene. The reaction mixture is stirred for 2 hours at 4° C. The white precipitate is filtered off and washed with 100 ml of toluene to afford 70.5 g of 3-acetoxy-2-phenyl-propionic acid octyl ester used as crude material in the next step.

To 70.5 g (220 mmol) of 3-acetoxy-2-phenyl-propionic acid octyl ester is added slowly at room temperature 41.1 g (270 mmol) of DBU and the reaction mixture is stirred for 1 hour, washed with water, dried over sodium sulfate and concentrated using a vacuum rotary evaporator. The residue is purified by distillation (84° C./0.2 mbar) to afford 27.5 g (48%) of compound 101, colourless liquid. $^1$H-NMR ($^1$H 400 MHz, CDCl$_3$): δ=7.50-7.25 (m, 5 arom. H), 6.37 (d, J=0.9 Hz, C=CHH, 1H), 5.91 (d, J=0.9 Hz, C=CHH, 1H), 4.25 (t, J=6.8 Hz, OCH$_2$, 2H), 1.80-1.65 (m, OCH$_2$CH$_2$, 2H), 1.50-1.10 (m, 10H), 0.92 (t, J=6.8 Hz, CH$_3$, 3H).

EXAMPLE 2

Preparation of 2-phenyl-acrylic Acid Octadecyl Ester (Compound 102)

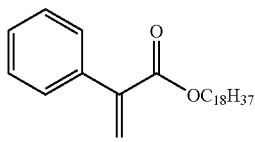

(102)

A mixture of 0.65 g (4.00 mmol) of 2-phenyl-acrylic acid methyl ester (CAS-Number: 1865-29-8), 1.08 g (4.00 mmol) of 1-octadecanol and 9.00 mg of dibutyltin oxide is heated up at 150° C. for 4 hours. The crude mixture is purified by flash chromatography on silica gel with hexane/diethyl ether=20:1 to afford 1.10 g (69%) of compound 102, white solid, m.p. 37-38° C. $^1$H-NMR ($^1$H 400 MHz, CDCl$_3$): δ=7.40-7.25 (m, 5 arom. H), 6.27 (s, C=CHH, 1H), 5.81 (s, C=CHH, 1H), 4.15 (t, J=6.8 Hz, OCH$_2$, 2H), 1.70-1.55 (m, OCH$_2$CH$_2$, 2H), 1.40-1.10 (m, 32H), 0.81 (t, J=6.8 Hz, CH$_3$, 3H). EI-MS: 400 (M$^+$).

EXAMPLE 3

Preparation of 2-phenyl-acrylic acid 3a,4,5,6,7,7α-hexahydro-3H-4,7-methano-inden-5-yl Ester (Compound 103)

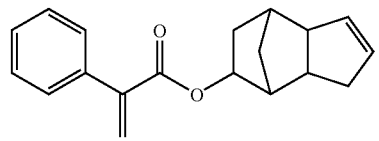

(103)

A mixture of 6.71 g (25.0 mmol) of phenyl-acetic acid 3a,4,5,6,7,7α-hexahydro-3H-4,7-methano-inden-5-yl ester, 11.1 g (80.0 mmol) of potassium carbonate, 370 mg (1.00 mmol) of tetrabutylammonium iodide and 2.25 g (75.00 mmol) of paraformaldehyde in 50 ml of dry toluene is heated up at 80-90° C. for 45 minutes under nitrogen. Then 100 ml of diethyl ether is added and the mixture is acidified (pH~3) with conc. HCl. The organic phase is washed with brine, dried over sodium sulfate and concentrated using a vacuum rotary evaporator. The crude material is purified by flash chromatography on silica gel with hexane/diethyl ether=4:1 to afford 4.46 g (64%) of compound 103, pale yellow liquid. $^1$H-NMR ($^1$H 400 MHz, CDCl$_3$): δ=7.35-7.05 (m, 5 arom. H), 6.16 (br. s, C=CHH, 1H), 5.72 (br. s, C=CHH, 1H), 5.60-5.50 (m, 1H), 5.35-5.25 (m, 1H), 4.70-4.60 (m, OCH, 1H), 2.55-2.33 (m, 2H), 2.10-1.65 (m, 5H), 1.45-1.10 (m, 3H). Cl-MS: 281 (MH$^+$).

EXAMPLE 4

Preparation of 2-phenyl-acrylic Acid Cyclohexyl Ester (Compound 104)

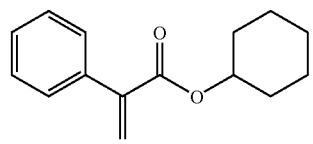

(104)

A mixture of 6.55 g (30.0 mmol) of phenyl-acetic acid cyclohexyl ester, 13.3 g (96.0 mmol) of potassium carbonate, 440 mg (1.20 mmol) of tetrabutylammonium iodide and 2.70 g (90.0 mmol) of paraformaldehyde in 60 ml of dry toluene is heated up at 80-90° C. for 30 minutes under nitrogen. Then 100 ml of diethyl ether is added and the mixture is acidified (pH~3) with 1N HCl. The organic phase is washed with brine, dried over sodium sulfate and concentrated using a vacuum rotary evaporator. The crude material is purified by flash chromatography on silica gel with hexane/diethyl ether=4:1 to afford 4.99 g (72%) of compound 104, colourless liquid. $^1$H-NMR ($^1$H 300 MHz, CDCl$_3$): δ=7.50-7.30 (m, 5 arom. H), 6.35 (d, J=1.2 Hz, C=CHH, 1H), 5.89 (d, J=1.2 Hz, C=CHH, 1H), 5.00-4.90 (m, OCH, 1H), 2.00-1.85 (m, 2H), 1.80-1.65 (m, 2 H), 1.62-1.22 (m, 6H). Cl-MS: 231 (MH$^+$).

EXAMPLE 5

Preparation of 2-phenyl-acrylic Acid Benzyl Ester (Compound 105)

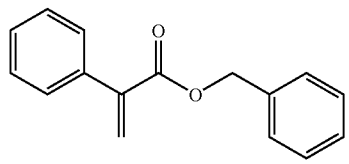

(105)

A mixture of 3.39 g (15.0 mmol) of phenyl-acetic acid benzyl ester, 6.63 g (48.0 mmol) of potassium carbonate, 220 mg (0.60 mmol) of tetrabutylammonium iodide and 1.35 g (45 mmol) of paraformaldehyde in 60 ml of dry toluene is heated up at 80-90° C. for 6 hours under nitrogen. Then 100 ml of diethyl ether is added and the mixture is acidified (pH~3) with conc. HCl. The organic phase is washed with brine, dried over sodium sulfate and concenrated using a vacuum rotary evaporator. The crude material is purified by flash chromatography on silica gel with hexane/diethyl ether=15:1 to afford 1.80 g (50%) of compound 105, colourless liquid. $^1$H-NMR ($^1$H 400 MHz, CDCl$_3$): δ=7.25-7.10 (m, 10 arom. H), 6.20 (d, J=1.2 Hz, C=CHH, 1H), 5.72 (d, J=1.2 Hz, C=CHH, 1H), 5.08 (s, OCH$_2$, 2H).

EXAMPLE 6

Preparation of 4-(2-phenyl-acryloyloxymethyl)-benzoic Acid Methyl Ester (Compound 106)

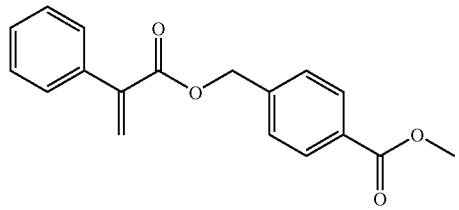

(106)

To a solution of 0.74 g (5.00 mmol) of 2-phenyl-acrylic acid (CAS-Number: 492-38-6) in 10 ml of dry toluene is added at room temperature 0.76 g (5.00 mmol) of DBU followed by 1.15 g (5.00 mmol) of 4-bromomethyl-benzoic acid methyl ester (CAS-Number: 2417-72-3). The reaction mixture is stirred for 3 hours, then diluted with diethyl ether. The organic phase is washed with 1M NH$_4$Cl, brine, dried over sodium sulfate and concentrated using a vacuum rotary evaporator. The crude material is purified by flash chromatography on silica gel with hexane/diethyl ether=3:1 to afford 1.10 g (74%) of compound 106, white solid, m.p. 56-58° C. $^1$H-NMR ($^1$H 300 MHz, CDCl$_3$): δ=8.00-7.85 (m, 2 arom. H), 7.40-7.15 (m, 5 arom. H), 6.30 (d, J=0.9 Hz, C=CHH, 1H), 5.82 (d, J=0.9 Hz, C=CHH, 1H), 5.19 (s, OCH$_2$, 2H), 3.79 (s, OCH$_3$, 3H).

EXAMPLE 7

Preparation of 4-(2-phenyl-acryloyloxymethyl)-benzoic Acid Ethyl Ester (Compound 107)

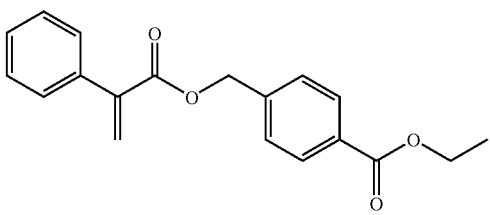

(107)

To a solution of 0.74 g (5.00 mmol) of 2-phenyl-acrylic acid (CAS-Number: 492-38-6) in 10 ml of dry toluene is added at room temperature 0.76 g (5.00 mmol) of DBU followed by 1.22 g (5.00 mmol) of 4-bromomethyl-benzoic acid ethyl ester (CAS-Number: 26496-94-6). The reaction mixture is stirred for 6 hours, then diluted with diethyl ether. The organic phase is washed with 1M NH$_4$Cl, dried over sodium sulfate and concentrated using a vacuum rotary evaporator. The crude material is purified by flash chromatography on silica gel with hexane/diethyl ether=3:1 to afford 0.95 g (61%) of compound 107, colourless liquid. $^1$H-NMR ($^1$H 400 MHz, CDCl$_3$): δ=8.10-8.05 (m, 2 arom. H), 7.50-7.32 (m, 7 arom. H), 6.45 (d, J=1.2 Hz, C=CHH, 1H), 5.97 (d, J=1.2 Hz, C=CHH, 1H), 5.35 (s, OCH$_2$, 2H), 4.41 (q, J=7.2 Hz, OCH$_2$CH$_3$, 2H), 1.43 (t, J=7.2 Hz, OCH$_2$CH$_3$, 3H).

EXAMPLE 8

Preparation of 2-phenyl-acrylic acid 4-nitro-benzyl Ester (Compound 108)

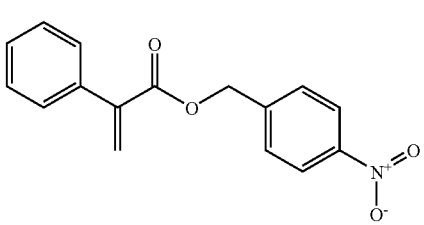

(108)

To a solution of 2.22 g (15.0 mmol) of 2-phenyl-acrylic acid (CAS-Number: 492-38-6) in 30 ml of dry toluene is added at room temperature 2.28 g (15.0 mmol) of DBU followed by 3.24 g (15.0 mmol) of 4-nitrobenzyl bromide (CAS-Number: 100-11-8; commercially available). The reaction mixture is stirred for 2 hours, then diluted with diethyl ether. The organic phase is washed with 1M NH$_4$Cl, brine, dried over sodium sulfate and concentrated using a vacuum rotary evaporator. The solid residue is recrystallised in dichloromethane/hexane to afford 3.89 g (92%) of compound 108, white solid, m.p. 88-89° C. $^1$H-NMR ($^1$H 300 MHz, CDCl$_3$):

δ=8.23 (d, J=9.0 Hz, 2 arom. H), 7.53 (d, J=9.0 Hz, 2 arom. H), 7.45-7.30 (m, 5 arom. H), 6.45 (d, J=1.2 Hz, C=CHH, 1H), 5.98 (d, J=1.2 Hz, C=CHH, 1H), 5.36 (s, OCH$_2$, 2H).

EXAMPLE 9

Preparation of 2-phenyl-acrylic Acid Benzhydryl Ester (Compound 109)

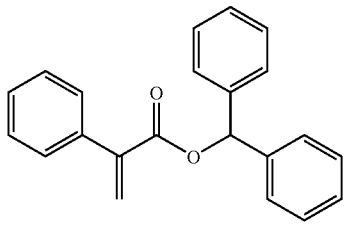

(109)

A mixture of 3.02 g (10.0 mmol) of phenyl-acetic acid benzhydryl ester (CAS-Number: 39868-89-8), 4.42 g (32.0 mmol) of potassium carbonate, 150 mg (0.40 mmol) of tetrabutylammonium iodide and 0.90 g (30.0 mmol) of paraformaldehyde in 20 ml of dry toluene is heated up at 80-90° C. for 1 hour under nitrogen. Then 80 ml of diethyl ether is added and the mixture is acidified (pH~3) with conc. HCl. The organic phase is washed with brine, dried over sodium sulfate and concentrated using a vacuum rotary evaporator. The crude material is purified by flash chromatography on silica gel with hexane/diethyl ether=8:1 to afford 1.00 g (52%) of compound 109, white solid, m.p. 54-56° C. $^1$H-NMR ($^1$H 400 MHz, CDCl$_3$): δ=7.50-7.25 (m, 15 arom. H), 7.05 (s, OCH, 1H), 6.52 (s, C=CHH, 1H), 5.99 (s, C=CHH, 1H. EI-MS: 314 (M$^+$).

EXAMPLE 10

Preparation of 2-phenyl-acrylic Acid Phenethyl Ester (Compound 110)

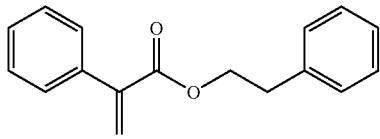

(110)

A mixture of 2.82 g (9.70 mmol) of phenyl-acetic acid phenethyl ester (CAS-Number: 102-20-5), 4.29 g (36.8 mmol) of potassium carbonate, 140 mg (0.39 mmol) of tetrabutylammonium iodide and 0.87 g (34.5 mmol) of paraformaldehyde in 20 ml of dry toluene is heated up at 80-90° C. for 1 hour under nitrogen. Then 80 ml of diethyl ether is added and the mixture is acidified (pH~3) with conc. HCl. The organic phase is washed with brine, dried over sodium sulfate and concentrated using a vacuum rotary evaporator. The crude material is purified by flash chromatography on silica gel with hexane/diethyl ether=6:1 to afford 1.48 g (60%) of compound 110, white solid, m.p. 28-30° C. $^1$H-NMR ($^1$H 400 MHz, CDCl$_3$): δ=7.40-7.20 (m, 10 arom. H), 5.93 (d, J=1.2 Hz, C=CHH, 1H), 5.90 (d, J=1.2 Hz, C=CHH, 1H), 4.48 (t, J=7.2 Hz, OCH$_2$CH$_2$, 2H), 3.04 (t, J=7.2 Hz, OCH$_2$CH$_2$, 2H). EI-MS: 252 (M$^+$).

EXAMPLE 11

Preparation of 2-(4-trifluoromethyl-phenyl)-acrylic Acid Ethyl Ester (Compound 111)

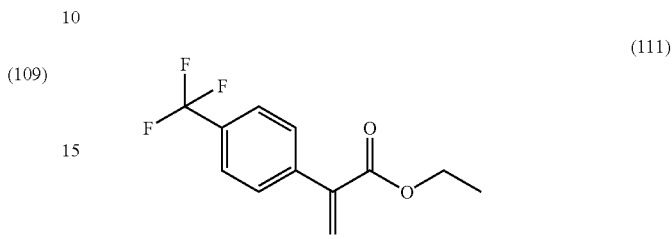

(111)

A mixture of 2.67 g (11.5 mmol) of (4-trifluoromethyl-phenyl)-acetic acid ethyl ester (CAS-Number: 721-63-1), 5.09 g (36.8 mmol) of potassium carbonate, 170 mg (0.46 mmol) of tetrabutylammonium iodide and 1.04 g (34.5 mmol) of paraformaldehyde in 60 ml of dry toluene is heated up at 80-90° C. for 2 hours under nitrogen. Then 100 ml of diethyl ether is added and the mixture is acidified (pH~3) with conc. HCl. The organic phase is washed with brine, dried over sodium sulfate and concentrated using a vacuum rotary evaporator. The crude material is purified by flash chromatography on silica gel with hexane/diethyl ether=3:1 to afford 1.82 g (65%) of compound 111, pale yellow liquid. $^1$H-NMR ($^1$H 300 MHz, CDCl$_3$): δ=7.62 (d, J=9.0 Hz, 2 arom. H), 7.54 (d, J=9.0 Hz, 2 arom. H), 6.47 (d, J=3.0 Hz, C=CHH, 1H), 5.96 (d, J=3.0 Hz, C=CHH, 1H), 4.30 (q, J=9.0 Hz, OCH$_2$CH$_3$, 2H), 1.34 (t, J=9.0 Hz, OCH$_2$CH$_3$, 3H).

EXAMPLE 12

Preparation of 2-phenyl-acrylic acid 6-(2-phenyl-acryloyloxy)-hexyl Ester (Compound 112)

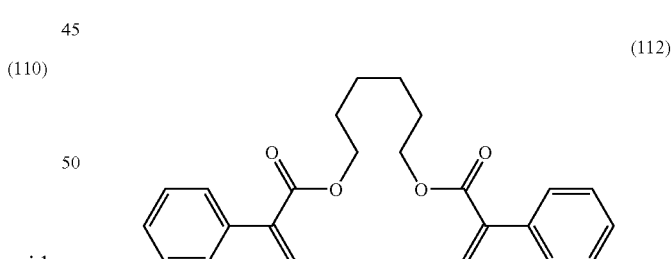

(112)

A mixture of 8.86 g (25.0 mmol) of phenyl-acetic acid 6-phenylacetoxy-hexyl ester (registered in Beilstein but no CAS-Number), 22.1 g (160 mmol) of potassium carbonate, 740 mg (2.00 mmol) of tetrabutylammonium iodide and 4.50 g (150 mmol) of paraformaldehyde in 150 ml of dry toluene is heated up at 80-90° C. for 12 hours under nitrogen. Then 200 ml of diethyl ether is added and the mixture is acidified (pH~3) with 1N HCl. The organic phase is washed with brine, dried over sodium sulfate and concentrated using a vacuum rotary evaporator. The crude material is purified by flash chromatography on silica gel with hexane/diethyl ether=3:1 to afford 2.53 g (27%) of compound 112, white solid, m.p.

35-36° C. $^1$H-NMR ($^1$H 400 MHz, CDCl$_3$): δ=7.48-7.30 (m, 10 arom. H), 6.34 (s, C=CHH, 2H), 5.88 (s, C=CHH, 2H), 4.28-4.18 (m, OCH$_2$, 4H), 1.78-1.62 (m, 4H), 1.50-1.35 (m, 4 H).

EXAMPLE 13

Preparation of 2-phenyl-acrylic acid 2,2-dimethyl-3-(2-phenyl-acryloyloxy)-propyl Ester (Compound 113)

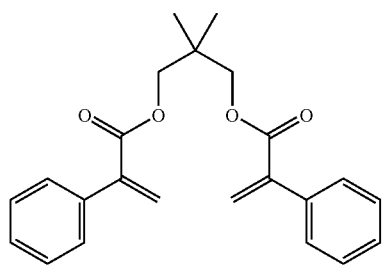

(113)

A mixture of 3.40 g (10.0 mmol) of phenyl-acetic acid 2,2-dimethyl-3-phenylacetoxy-propyl ester, 8.85 g (64.0 mmol) of potassium carbonate, 300 mg (0.80 mmol) of tetrabutylammonium iodide and 1.80 g (60.0 mmol) of paraformaldehyde in 80 ml of dry toluene is heated up at 80-90° C. for 2 hours under nitrogen. Then 100 ml of diethyl ether is added and the mixture is acidified (pH~3) with 1N HCl. The organic phase is washed with brine (3×50 ml), dried over sodium sulfate and concentrated using a vacuum rotary evaporator. The crude material is purified by flash chromatography on silica gel with hexane/diethyl ether=4:1 to afford 1.35 g (37%) of compound 113, white solid, m.p. 74-76° C. $^1$H-NMR ($^1$H 400 MHz, CDCl$_3$): δ=7.45-7.30 (m, 10 arom. H), 6.36 (s, C=CHH, 2H), 5.89 (s, C=CHH, 2H), 4.02 (s, OCH$_2$, 4H), 0.99 (s, CH$_3$, 6H).

EXAMPLE 14

Preparation of 2-[4-(1-Isopropoxycarbonyl-vinyl)-phenyl]-acrylic Acid Isopropyl Ester (Compound 114)

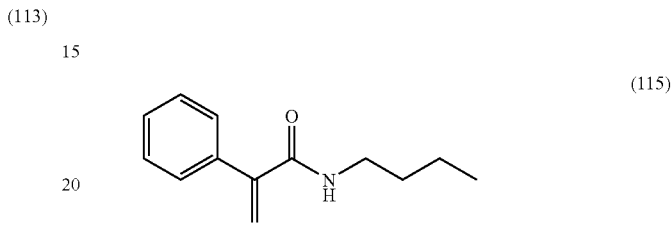

(114)

A mixture of 3.34 g (12.0 mmol) of (4-isopropoxycarbonylmethyl-phenyl)-acetic acid isopropyl ester, 10.61 g (76.8 mmol) of potassium carbonate, 350 mg (0.96 mmol) of tetrabutylammonium iodide and 2.16 g (72.0 mmol) of paraformaldehyde in 80 ml of dry toluene is heated up at 80-90° C. for 1 hour under nitrogen. Then 100 ml of diethyl ether is added and the mixture is acidified (pH~3) with 1N HCl. The organic phase is washed with brine (3×50 ml), dried over sodium sulfate and concentrated using a vacuum rotary evaporator. The crude material is purified by flash chromatography on silica gel with hexane/diethyl ether=3:1 to afford 1.52 g (42%) of compound 114, white solid, m.p. 72-74° C. $^1$H-NMR ($^1$H 400 MHz, CDCl$_3$): δ=7.42 (s, 4 arom. H), 6.32 (s, C=CHH, 2H), 5.89 (s, C=CHH, 2H), 5.22-5.10 (m, OCH, 2H), 1.32 (d, J=4.0 Hz, 4H).

EXAMPLE 15

Preparation of N-butyl-2-phenyl-acrylamide (Compound 115)

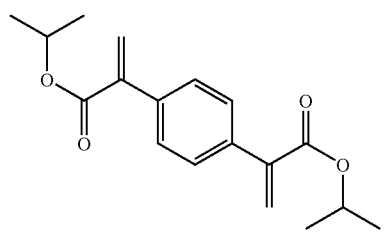

(115)

A mixture of 2.96 g (20.0 mmol) of 2-phenyl-acrylic acid (CAS-Number: 492-38-6), 95 mg of t-butylcatechol, 135 mg of N,N-dimethylformamide and 2.38 g (20 mmol) of thionyl chloride in 7.0 ml of dry toluene is heated up at 50° C. for 5 hours under nitrogen. The excess of thionyl chloride is distilled off and the residue (2-phenyl-acryloyl chloride, CAS-Number: 51491-68-0) is added dropwise at 0° C. to a mixture of 1.10 g (15.0 mmol) of butylamine and 1.58 g (20 mmol) of pyridine in 10 ml of toluene. The reaction mixture is stirred for 12 hours at 0° C., then 50 ml of diethyl ether is added and the mixture is washed with 1N NH$_4$Cl, brine, dried over sodium sulfate and concentrated using a vacuum rotary evaporator. The crude material is purified by flash chromatography on silica gel with hexane/diethyl ether=2:1 to afford 1.35 g (44%) of compound 115, white solid, m.p. 44-46° C. $^1$H-NMR ($^1$H 400 MHz, CDCl$_3$): δ=7.45-7.30 (m, 5 arom. H), 6.15 (d, J=1.2 Hz, C=CHH, 1H), 5.66 (br. s, NH, 1H), 5.61 (d, J=1.2 Hz, C=CHH, 1H), 3.42-3.28 (m, NHCH$_2$, 2H), 1.60-1.40 (m, 2H), 1.40-1.20 (m, 2H), 0.93 (t, J=7.6 Hz, CH$_3$, 3H).

EXAMPLE 16

Preparation of 2-phenyl-N-(1,1,3,3-tetramethyl-butyl)-acrylamide (Compound 116)

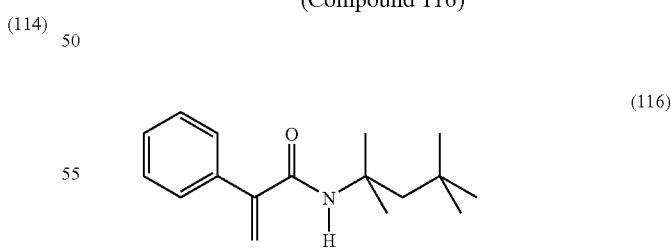

(116)

A mixture of 1.48 g (10.0 mmol) of 2-phenyl-acrylic acid (CAS-Number: 492-38-6) and 8.0 ml of thionyl chloride is heated up at 50° C. for 4 hours under nitrogen. The excess of thionyl chloride is distilled off, the residue (2-phenyl-acryloyl chloride, CAS-Number: 51491-68-0) is dissolved in 5.0 ml of dichloromethane and a solution of 1.29 g (10.0 mmol) of t-octylamine in 15 ml of dichloromethane is added at 0° C. After the addition, the reaction mixture is stirred for 12 hours at room temperature. Then 50 ml of diethyl ether is added and the mixture is acidified (pH~2) with 1N HCl. The organic phase is washed with brine, dried over sodium sulfate and concentrated using a vacuum rotary evaporator. The crude material is purified by flash chromatography on silica gel with hexane/diethyl ether=3:1 to afford 0.98 g (38%) of compound 116, white solid, m.p. 73-74° C. $^1$H-NMR ($^1$H 400 MHz, CDCl$_3$): δ=7.35-7.25 (m, 5 arom. H), 6.02 (d, J=1.2 Hz, C=CHH, 1H), 5.50 (br. s, NH, 1H), 5.46 (d, J=1.2 Hz, C=CHH, 1H), 1.64 (s, 2H), 1.36 (s, NH—C—(CH$_3$)$_2$, 6H), 0.85 (s, CH$_3$, 9H).

EXAMPLE 17

Preparation of 2-phenyl-1-pyrrolidin-1-yl-propanone (Compound 117)

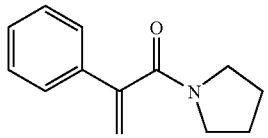
(117)

A mixture of 0.96 g (6.50 mmol) of 2-phenyl-acrylic acid (CAS-Number: 492-38-6) and 5.0 ml of thionyl chloride is heated up at 50° C. for 2 hours under nitrogen. The excess of thionyl chloride is distilled off, the residue (2-phenyl-acryloyl chloride, CAS-Number: 51491-68-0) is dissolved in 5.0 ml of dichloromethane and. a solution of 0.53 g (7.15 mmol) of pyrrolidine in 20 ml of dichloromethane is added at 0° C. After the addition, the reaction mixture is stirred for 12 hours at room temperature. Then 50 ml of diethyl ether is added and the mixture is acidified (pH~2) with 1N HCl. The organic phase is washed with brine, dried over sodium sulfate and concentrated using a vacuum rotary evaporator. The crude material is purified by flash chromatography on silica gel with hexane/diethyl ether=1:2 to afford 0.35 g (27%) of compound 117, yellow liquid. $^1$H-NMR ($^1$H 400 MHz, CDCl$_3$): δ=7.50-7.25 (m, 5 arom. H), 5.71 (s, C=CHH, 1H), 5.43 (s, C=CHH, 1H), 3.60 (t, J=8.0 Hz, NCH$_2$, 2H), 3.22 (t, J=8.0 Hz, NCH$_2$, 2H), 1.95-1.75 (m, NCH$_2$CH$_2$, 4H). EI-MS: 201 (M$^+$).

EXAMPLE 18

Preparation of N-cyclohexyl-2-phenyl-acrylamide (Compound 118)

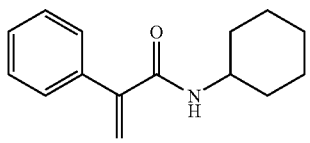
(118)

A mixture of 2.22 g (15.0 mmol) of 2-phenyl-acrylic acid (CAS-Number: 492-38-6) and 5.35 g (45.0 mmol) ml of thionyl chloride in 7.0 ml of dry toluene is heated up at 50° C. for 2 hours under nitrogen. The excess of thionyl chloride is distilled off, the residue (2-phenyl-acryloyl chloride, CAS-Number: 51491-68-0) is dissolved in 20 ml of dry toluene and 1.49 g (15.0 mmol) of cyclohexylamine is slowly added at 0° C. After the addition, the reaction mixture is stirred for 2 hours at room temperature. Then 80 ml of diethyl ether is added and the organic phase is washed with water, dried over sodium sulfate and concentrated using a vacuum rotary evaporator. The solid residue is recrystallised in ethyl acetate/hexane to afford 1.30 g (38%) of compound 118, white solid, m.p. 131-132° C. $^1$H-NMR ($^1$H 400 MHz, CDCl$_3$): δ=7.45-7.30 (m, 5 arom. H), 6.10 (br. s, C=CHH, 1H), 5.60 (br. s, C=CHH, 1H), 5.55 (br. s, NH, 1H), 3.95-3.85 (m, NH—CH, 1H), 2.00-1.90 (m, 2H), 1.75-1.55 (m, 3H), 1.45-1.30 (m, 2H), 1.20-1.00 (m, 3H). $^{13}$C-NMR (100 MHz, CDCl$_3$): 166.4 (s); 145.1 (s); 137.2 (s); 128.7 (d); 128.5 (d); 128.1 (d); 121.7 (t); 48.5 (d); 32.9 (t); 25.5 (t); 24.8 (t). Cl-MS: 230 (MH$^+$).

EXAMPLE 19

Preparation of 4-(1-phenylsulfanyl-vinyl)-benzoic Acid Methyl Ester (Compound 119)

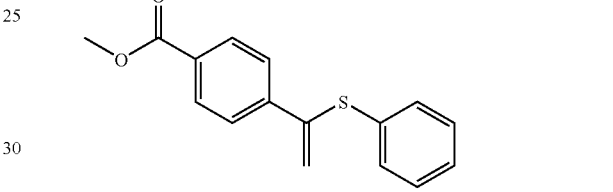
(119)

A mixture of 2.58 g (10.0 mmol) of 4-phenylsulfanylmethyl-benzoic acid methyl ester (CAS-Number: 88393-07-1; commercially available), 4.42 g (32.0 mmol) of potassium carbonate, 150 mg (0.46 mmol) of tetrabutylammonium iodide and 0.90 g (30.0 mmol) of paraformaldehyde in 20 ml of dry toluene is heated up at 80-90° C. for 30 minutes under nitrogen. Then 100 ml of diethyl ether is added and the mixture is acidified (pH~3) with 1N HCl. The organic phase is washed with brine, dried over sodium sulfate and concentrated using a vacuum rotary evaporator. The crude material is purified by flash chromatography on silica gel with hexane/diethyl ether=5:1 to afford 1.38 g (65%) of compound 119, yellow solid, m.p. <25° C. $^1$H-NMR ($^1$H 400 MHz, CDCl$_3$): δ=8.00-7.95 (m, 2 arom. H), 7.70-7.65 (m, 2 arom. H), 7.40-7.20 (m, 5 arom. H), 5.76 (s, C=CHH, 1H), 5.46 (s, C=CHH, 1H), 3.92 (s, OCH$_3$, 3H).

EXAMPLE 20

Preparation of 4-(1-benzenesulfonyl-vinyl)-benzoic Acid Methyl Ester (Compound 120)

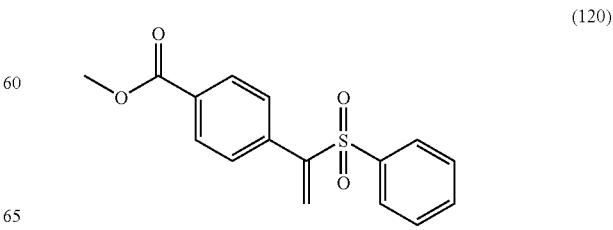
(120)

To a solution of 2.32 g (8.00 mmol) of 4-benzenesulfonyl-methyl-benzoic acid methyl ester (CAS-Number: 59584-27-9) in 16 ml of dimethylsulfoxide is added at room temperature 1.23 g (12.0 mmol) of N,N,N',N'-tetramethyldiaminomethane followed by 2.70 g (26.4 mmol) of acetic anhydride. The reaction mixture is heated up at 50° C. for 6 hours, then diluted with diethyl ether (80 ml). The organic phase is washed with 1M NaHCO$_3$, brine, dried over sodium sulfate and concentrated using a vacuum rotary evaporator. The crude material is purified by flash chromatography on silica gel with hexane/ethyl acetate=3:1 to afford 1.35 g (65%) of compound 120, pale yellow solid, m.p. 72-75° C. $^1$H-NMR ($^1$H 300 MHz, CDCl$_3$): δ=8.00-7.93 (m, 2 arom. H), 7.75-7.68 (m, 2 arom. H), 7.65-7.55 (m, 1 arom. H), 7.50-7.40 (m, 4 arom. H), 6.74 (s, C=CHH, 1H), 6.06 (s, C=CHH, 1H), 3.94 (s, OCH$_3$, 3H).

EXAMPLE 21

Preparation of 3-benzenesulfinyl-2-phenyl-acrylonitrile (Compound 121)

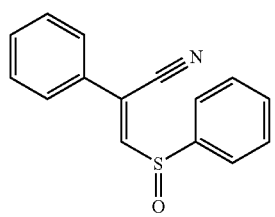

(121)

To a solution of 0.70 g (2.95 mmol) of 2-phenyl-3-phenyl-sulfanyl-acrylonitrile (registered in Beilstein but no CAS-Number) in 3.0 ml of dry dichloromethane is added dropwise at 0° C. a dried (MgSO$_4$) solution of 0.46 g (2.66 mmol) of m-chlorobenzoic acid (mCPBA) in 6.0 ml of dry dichloromethane. The resulting mixture is stirred for 2 hours at room temperature and then a solution of 154 mg (2.66 mmol) of potassium fluoride in 10 ml of dichloromethane is added. After stirring for 1 hour, the solid residue is filtered off through celite, washed with dichloromethane and the filtrate is evaporated to dryness using a vacuum rotary evaporator. The crude material is purified by flash chromatography on silica gel with hexane/diethyl ether=1:3 to afford 0.40 g (53%) of compound 121 as a single isomer, pale yellow solid, m.p. 118-120° C. $^1$H-NMR ($^1$H 300 MHz, CDCl$_3$): δ=7.85-7.75 (m, 2 arom. H), 7.65-7.50 (m, 5 arom. H), 7.50-7.40 (m, 3 arom. H), 7.34 (s, SO—CH, 1H). $^{13}$C-NMR (75 MHz, CDCl$_3$): 148.1 (d); 142.9 (s); 132.1 (d); 131.7 (d); 130.4 (s); 129.9 (d); 129.4 (d); 126.8 (d); 124.2 (d); 121.3 (s); 114.0 (s).

EXAMPLE 22

Preparation of 3-benzenesulfonyl-2-phenyl-acrylonitrile (Compound 122)

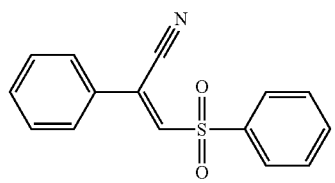

(122)

To a solution of 0.71 g (3.00 mmol) of 2-phenyl-3-phenyl-sulfanyl-acrylonitrile (registered in Beilstein but no CAS-Number) in 3.0 ml of dry dichloromethane is added dropwise at 0° C. a dried (MgSO$_4$) solution of 1.04 g (6.00 mmol) of m-chlorobenzoic acid (mCPBA) in 6.0 ml of dry dichloromethane. The resulting mixture is stirred for 1 hour at room temperature and then a solution of 347 mg (6.00 mmol) of potassium fluoride in 10 ml of dichloromethane is added. After stirring for 1 hour, the solid residue is filtered off through celite, washed with dichloromethane and the filtrate is evaporated to dryness using a vacuum rotary evaporator. The solid residue is recrystallised in ethyl acetate/hexane to afford 0.50 g (62%) of compound 122 as a cis/trans mixture of isomers, white solid, m.p. 129-130° C. $^1$H-NMR ($^1$H 300 MHz, CDCl$_3$): δ=8.15-8.05 (m, 2 arom. H), 7.80-7.55 (m, 8 arom. H), 7.35 (s, SO$_2$—CH, 1H). Cl-MS: 270 (MH$^+$).

EXAMPLE 23

Preparation of 2-benzenesulfinyl-3-phenyl-acrylic Acid Ethyl Ester (Compound 123)

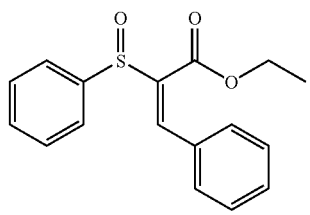

(123)

A mixture of 2.12 g (10.0 mmol) of benzenesulfinyl-acetic acid ethyl ester (CAS-Number: 54882-04-1), 1.27 g (12.0 mmol) of benzaldehyde, 85 mg (1.00 mmol) of piperidine in 20 ml of acetonitrile is heated up at 60° C. for 2 days, then diluted with diethyl ether (80 ml). The organic phase is washed with 1N HCl, brine, dried over sodium sulfate and concentrated using a vacuum rotary evaporator. The crude material is purified by flash chromatography on silica gel with hexane/ethyl acetate=6:1 to afford 1.50 g (50%) of compound 123 as a mixture of isomers, yellow liquid. $^1$H-NMR ($^1$H 300 MHz, CDCl$_3$): δ=7.70-7.60 (m, 3 arom. H), 7.60-7.45 (m, 2 arom. H), 7.45-7.35 (m, 3 arom. H), 7.35-7.25 (m, 3 arom. H), 4.10-3.90 (m, OCH$_2$, 2H), 1.05-0.92 (m, OCH$_2$CH$_3$, 3H). Cl-MS: 301 (MH$^+$).

EXAMPLE 24

Preparation of 2-benzenesulfonyl-3-[4-(2-benzene-sulfonyl-2-ethoxycarbonylvinyl)-phenyl]-acrylic Acid Ethyl Ester (Compound 124)

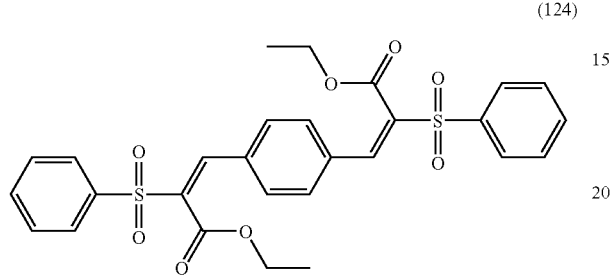

(124)

A mixture of 9.13 g (40.0 mmol) of benzenesulfonyl-acetic acid ethyl ester (CAS-Number: 7605-30-3), 2.68 g (20.0 mmol) of terephtaldehyde, 0.07 ml of piperidine and 0.23 ml of acetic acid in 40 ml of toluene is heated under reflux for 24 hours. Then 150 ml of diethyl ether is added and the organic phase is washed with water, brine, dried over sodium sulfate and concentrated using a vacuum rotary evaporator. The viscous liquid residue is dissolved in hot ethyl acetate and cold hexane is added. A solid formed which is filtered off, washed with hexane and dried to afford 4.53 g (41%) of compound 124 as a single isomer, off-white solid, m.p. 181-183° C. $^1$H-NMR ($^1$H 400 MHz, CDCl$_3$): δ=8.00-7.90 (m, 6 arom. H), 7.70-7.50 (m, 6 arom. H), 7.45 (s, Ph-CH, 2H), 4.20 (q, J=7.2 Hz, OCH$_2$, 4H), 1.14 (t, J=7.2 Hz, OCH$_2$CH$_3$, 6H). EI-MS: 554 (M$^+$).

EXAMPLE 25

Preparation of 2-benzenesulfinyl-3-phenyl-acrylonitrile (Compound 125)

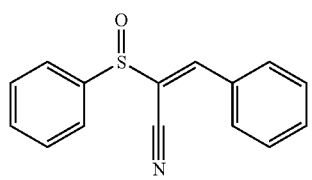

(125)

A mixture of 5.45 g (33.0 mmol) of benzenesulfinyl-acetonitrile (CAS-Number: 17665-58-6; 98639-88-4; 122270-30-8), 3.50 g (33.0 mmol) of benzaldehyde, 280 mg (3.30 mmol) of piperidine in 66 ml of acetonitrile is heated up at 60° C. for 1 day, then diluted with diethyl ether (100 ml). The organic phase is washed with 1N HCl, brine, dried over sodium sulfate and concentrated using a vacuum rotary evaporator. The crude material is purified by flash chromatography on silica gel with hexane/ethyl acetate=3:1 to afford 4.48 g (54%) of compound 125 as a mixture of isomers, off-white solid, m.p. 75-77° C. $^1$H-NMR ($^1$H 300 MHz, CDCl$_3$): δ=7.90-7.80 (m, 3 arom. H), 7.80-7.70 (m, 2 arom. H), 7.60-7.40 (m, 5 arom. H+Ph-CH).

EXAMPLE 26

Sodium 2-phenyl-acrylate (compound 126) is known [CAS-Number: 6422-97-5]

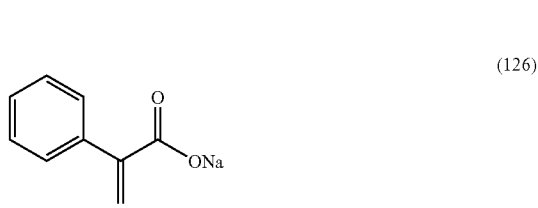

(126)

and is prepared by treating an aqueous solution of 2-phenyl-acrylic acid with a 5% aqueous solution of sodium hydroxide.

EXAMPLE 27

2-Phenyl-acrylic acid (compound 127) is known [CAS-Number: 492-38-6]

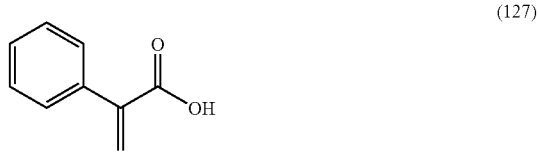

(127)

and is prepared by treating an acetone solution of 2-phenyl-acrylic acid ethyl ester with an aqueous solution of potassium hydroxide according to the following literature: S. J. Mahmood, C. Brennan, M. M. Hossain *Synthesis* 2002, 13, 1807-1809.

EXAMPLE 28

2-Phenyl-acrylic acid methyl ester (compound 128) is known [CAS-Number: 1865-29-8]

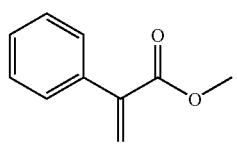

(128)

and is prepared by treating a methylene chloride solution of 3-acetoxy-2-phenyl-propionic acid methyl ester with DBU.

EXAMPLE 29

2-Phenyl-acrylic acid ethyl ester (compound 129) is known [CAS-Number: 22286-82-4]

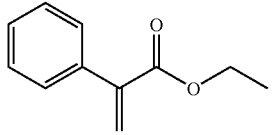
(129)

and is prepared by treating a toluene solution of phenyl acetic ethyl ester with paraformaldehyde, potassium carbonate, tetrabutylammonium iodide according to the following literature: H. Stalder, M. Boes *Chimia* 2000, 54, 669-671.

EXAMPLE 30

2-Phenyl-acrylic acid isopropyl ester (compound 130) is known [CAS-Number: 24812-09-7]

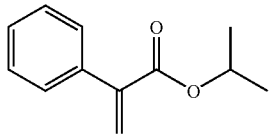
(130)

and is prepared by treating a toluene solution of phenyl acetic isopropyl ester with paraformaldehyde, potassium carbonate, tetrabutylammonium iodide according to the following literature: H. Stalder, M. Boes *Chimia* 2000, 54, 669-671.

EXAMPLE 31

2-Phenyl-acrylic acid butyl ester (compound 131) is known [CAS-Number: 15895-94-0]

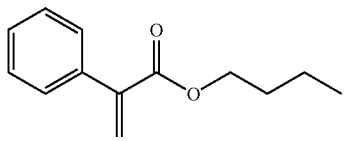
(131)

and is prepared by treating a methylene chloride solution of 3-acetoxy-2-phenyl-propionic acid butyl ester with DBU.

EXAMPLE 32

2-Phenyl-acrylic acid tert-butyl ester (compound 132) [known in Beilstein but no CAS-Number]

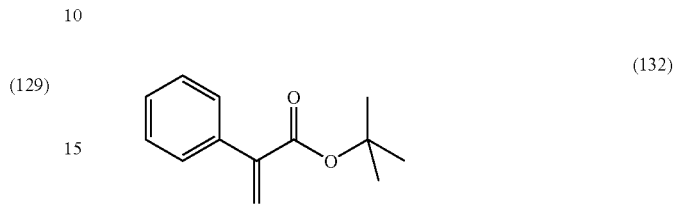
(132)

is prepared by treating a toluene solution of phenyl acetic butyl ester with paraformaldehyde, potassium carbonate, tetrabutylammonium iodide according to the following literature: H. Stalder, M. Boes *Chimia* 2000, 54, 669-671.

EXAMPLE 33

2-(4-Methoxy-phenyl)-acrylic acid methyl ester (compound 133) is known [CAS-Number: 50415-68-4]

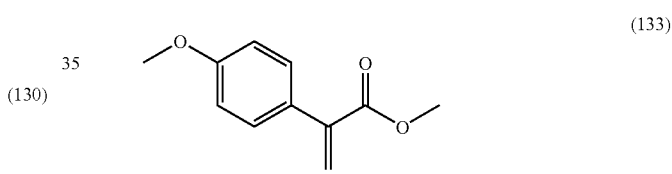
(133)

and is prepared by treating a toluene solution of (4-methoxyphenyl)-acetic acid methyl ester with paraformaldehyde, potassium carbonate, tetrabutylammonium iodide according to the following literature: H. Stalder, M. Boes *Chimia* 2000, 54, 669-671.

EXAMPLE 34

4-(1-Methoxycarbonyl-vinyl)-benzoic acid methyl ester (compound 134) [known in Beilstein but no CAS-Number]

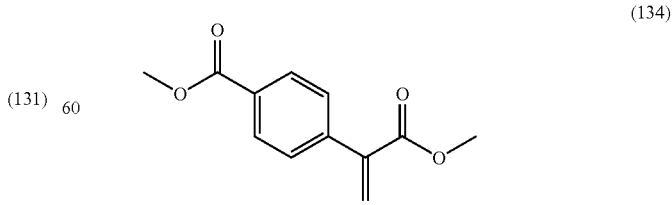
(134)

is prepared by treating a toluene solution of 4-methoxycarbonylmethyl-benzoic acid methyl ester with paraformaldehyde, potassium carbonate, tetrabutylammonium iodide according to the following literature: H. Stalder, M. Boes *Chimia* 2000, 54, 669-671.

EXAMPLE 35

2-(4-Nitro-phenyl)-acrylic acid methyl ester (compound 135) [CAS-Number: 28042-27-5] is prepared according to the following literature: Y. Todo, J. Nitta, M. Miyajima, Y. Fukuoka, Y. Yamashiro, N. Nishida, I. Saikawa, H. Narita *Chem. Pharm. Bull.* 1994, 42, 2063-2070.

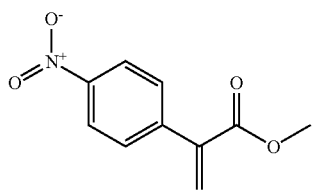

(135)

To a solution of 1.46 g (7.50 mmol) of (4-nitro-phenyl)-acetic acid methyl ester (CAS-Number: 2945-08-6) in 15 ml of dimethylsulfoxide is added at room temperature 1.15 g (11.3 mmol) of N,N,N',N'-tetramethyldiaminomethane followed by 2.53 g (24.8 mmol) of acetic anhydride. The reaction mixture is stirred for 2 hours, then diluted with diethyl ether (80 ml). The organic phase is washed with 1M NaHCO$_3$ (40 ml), brine (2×40 ml), dried over sodium sulfate and concentrated using a vacuum rotary evaporator. The solid residue is recrystallised in diethylether/hexane to give 1.30 g (84%) of compound 135, white solid, m.p. 110-111° C. (lit.: m.p. 110.5-111° C.).

$^1$H-NMR ($^1$H 300 MHz, CDCl$_3$): δ=8.45-8.37 (m, 2 arom. H), 7.80-7.75 (m, 2 arom. H), 6.74 (d, J=0.6 Hz, C=CHH, 1H), 6.23 (d, J=0.6 Hz, C=CHH, 1H), 4.05 (s, OCH$_3$, 3H).

EXAMPLE 36

2-(4-Bromo-phenyl)-acrylic acid ethyl ester (compound 136) [known in Beilstein but no CAS-Number]

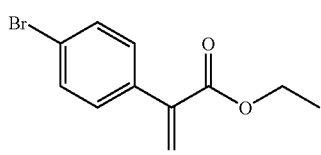

(136)

is prepared by treating a toluene solution of (4-bromo-phenyl)-acetic acid ethyl ester with paraformaldehyde, potassium carbonate, tetrabutylammonium iodide according to the following literature: H. Stalder, M. Boes *Chimia* 2000, 54, 669-671.

EXAMPLE 37

2-Naphthalen-1-yl-acrylic acid ethyl ester (compound 137) is known [CAS-Number: 54160-60-0]

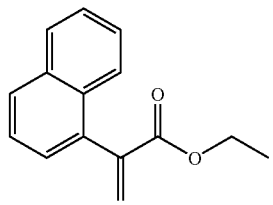

(137)

and is prepared by treating a toluene solution of naphthalen-1-yl-acetic acid ethyl ester with paraformaldehyde, potassium carbonate, tetrabutylammonium iodide according to the following literature: H. Stalder, M. Boes *Chimia* 2000, 54, 669-671.

EXAMPLE 38

2-Phenyl-acrylamide (compound 138) is known [CAS-Number: 14485-09-7]

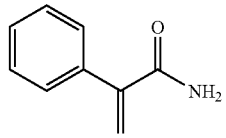

(138)

and is prepared by treating a DMF solution of 2-phenyl-acrylic acid with thionyl chloride in the presence of tert-butylcatechol to afford 2-phenyl-acryloyl chloride. The latter is subsequently treated with a 30% aqueous solution of ammonia according to the following literature: K. Nishiyama, Y. Inouye *Agric. Biol. Chem.* 1982, 46, 1027-1034.

EXAMPLE 39

1-Morpholin-4-yl-2-phenyl-propanone (compound 139) is known [CAS-Number: 19199-46-3]

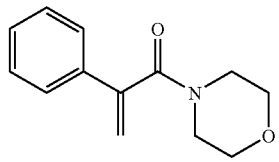

(139)

and is prepared by treating a toluene solution of 1-morpholin-4-yl-2-phenyl-ethanone with paraformaldehyde, potassium

EXAMPLE 40

2,N-Diphenyl-acrylamide (compound 140) is known [CAS-Number: 64859-23-0]

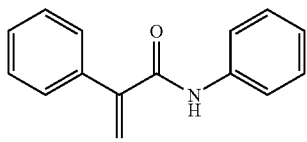
(140)

is prepared by treating a N,N-dimethylformamide solution of 2,N-diphenyl-acetamide with paraformaldehyde, potassium carbonate, tetrabutylammonium iodide according to the following literature: H. Stalder, M. Boes Chimia 2000, 54, 669-671.

EXAMPLE 41

N-Methyl-2,N-diphenyl-acrylamide (compound 141) [known in Beilstein but no CAS-Number]

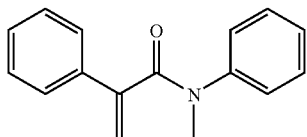
(141)

is prepared by treating 2-phenyl-acrylic acid with thionyl chloride to afford 2-phenyl-acryloyl chloride. The latter is subsequently treated with N-methylalanine in dichloromethane according to the following literature: H. P. Ward, E. F. Jenkins J. Org. Chem. 1945, 10, 371-373.

EXAMPLE 42

2-Phenyl-N-p-tolyl-acrylamide (compound 142) [known in Beilstein but no CAS-Number]

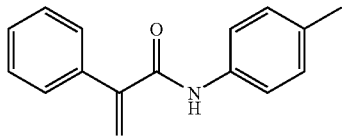
(142)

A mixture of 11.3 g (50.0 mmol) of 2-phenyl-N-p-tolyl-acetamide (CAS-Number: 6876-65-9; commercially available), 14.5 g (105 mmol) of potassium carbonate, 370 mg (1.00 mmol) of tetrabutylammonium iodide and 3.00 g (100 mmol) of paraformaldehyde in 20 ml of dry toluene is heated up at 80-90° C. for 1 hour under nitrogen. The reaction mixture is cooled down to 0° C. and acidified (pH~3) with 1N HCl. The aqueous phase is separated and to the organic phase is added diethyl ether (50 ml) and hexane (50 ml). The solid formed is filtered off, washed with hexane (20 ml) and dried to afford 6.32 g (53%) of compound 142, white solid, m.p. 164-165° C. Lit.: H. Stalder, M. Boes Chimia 2000, 54, 669-671.

EXAMPLE 43

1-Phenylethenyl phenyl sulfoxide (compound 143) is known [CAS-Number: 49833-32-1; 141642-34-4]

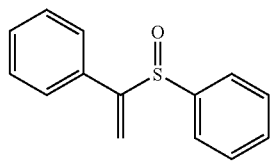
(143)

and is prepared by treating a toluene solution of 2-cyanoethyl phenyl sulfoxide with ethynylbenzene according to the following literature: M. C. Aversa, A. Barattucci, P. Bonaccorsi, G. Bruno, P. Giannetto, M. Policicchio, Tetrahedron Lett. 2000, 41, 4441-4446.

EXAMPLE 44

α-Benzolsulfonylstyrol (compound 144) is known [CAS-Number: 49833-39-8]

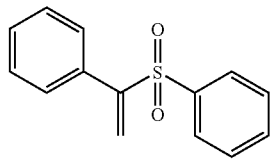
(144)

and is prepared by treating a methylene chloride solution of 1-phenylethenyl phenyl sulfoxide with m-chlorobenzoic acid.

EXAMPLE 45

3-Phenyl-chromen-2-one (3-phenylcoumarin, 3-Phenyl-1-benzopyran-2-one) (compound 145) is known [CAS-Number: 955-10-2; commercially available]

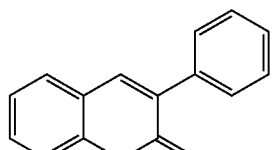
(145)

and is prepared by treating an aqueous solution of phenylacetonitrile and salicylaldehyde with sodium hydroxide accord-

EXAMPLE 46

2,3-Diphenyl-acrylonitrile (compound 146) is known [CAS-Number: 2510-95-4; 6114-57-4; 16610-80-3]

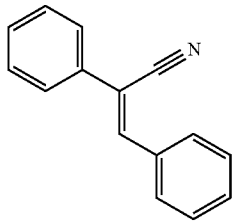
(146)

and is prepared by treating a toluene solution of phenylacetonitrile, benzaldheyde, tetrabutylammonium iodide with an aqueous solution of sodium hydroxide according to the following literature: I. P. Beletskaya, N. S. Gulyukina, M. Ali Ali, A. A. Solov'yanov, O. A. Reutov *J. Org. Chem. USSR* (*Engl. Transl.*) 1987, 23, 657-661.

EXAMPLE 47

3-(4-Chloro-phenyl)-2-phenyl-acrylonitrile (compound 147) is known [CAS-Number: 3695-92-9; 37629-64-4]

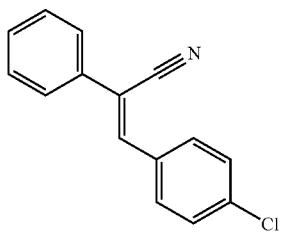
(147)

and is prepared by treating a toluene solution of phenylacetonitrile, 4-chlorobenzaldehyde, tetrabutylammonium iodide with an aqueous solution of sodium hydroxide according to the following literature: I. P. Beletskaya, N. S. Gulyukina, M. Ali Ali, A. A. Solov'yanov, O. A. Reutov *J. Org. Chem. USSR* (*Engl. Transl.*) 1987, 23, 657-661.

EXAMPLE 48

4-(1-Cyano-2-phenyl-vinyl)-benzoic acid methyl ester (compound 148) [known in Beilstein but no CAS-number]

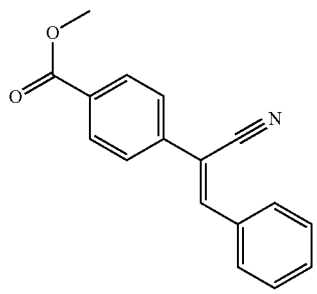
(148)

is prepared by treating a toluene solution of 4-cyanomethyl-benzoic acid methyl ester (CAS-Number: 76469-88-0), benzaldheyde, tetrabutylammonium iodide with an aqueous solution of sodium hydroxide according to the following literature: I. P. Beletskaya, N. S. Gulyukina, M. Ali Ali, A. A. Solov'yanov, O. A. Reutov *J. Org. Chem. USSR* (*Engl. Transl.*) 1987, 23, 657-661.

EXAMPLE 49

4-(1-Cyano-2-phenyl-vinyl)-benzoic acid methyl ester (compound 149) [known in Beilstein but no CAS-number]

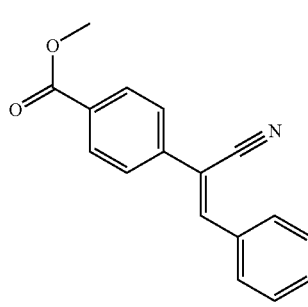
(149)

is prepared by treating a toluene solution of 4-cyanomethyl-benzoic acid methyl ester (CAS-Number: 76469-88-0), 4-chlorobenzaldheyde, tetrabutylammonium iodide with an aqueous solution of sodium hydroxide according to the following literature: I. P. Beletskaya, N. S. Gulyukina, M. Ali Ali, A. A. Solov'yanov, O. A. Reutov *J. Org. Chem. USSR* (*Engl. Transl.*) 1987, 23, 657-661.

EXAMPLE 50

2-Phenyl-3-thiophen-2-yl-acrylonitrile (compound 150) is known [CAS-number: 96461-07-3; 123293-55-0]

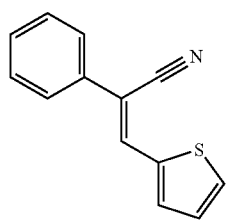

(150)

and is prepared by treating a toluene solution of phenylacetonitrile, thiophene-2-carbaldehyde, tetrabutylammonium iodide with an aqueous solution of sodium hydroxide according to the following literature: I. P. Beletskaya, N. S. Gulyukina, M. Ali Ali, A. A. Solov'yanov, O. A. Reutov *J. Org. Chem. USSR* (*Engl. Transl.*) 1987, 23, 657-661.

EXAMPLE 51

2,3-Diphenyl-acrylonitrile (compound 151) is known [CAS-Number: 5533-33-5; 53105-00-3; 65645-46-7]

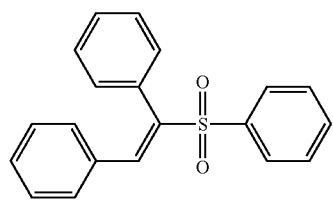

(151)

is prepared by treating a tert-butanol solution of 1-acetoxy-2-(phenylsulfonyl)-1,2-diphenylethane with potassium tert-butanolate according to the following literature: J. Otera, H. Misawa, K. Sugimoto *J. Org. Chem.* 1986, 51, 3830-3833.

EXAMPLE 52

3-Hydroxy-2-phenyl-acrylonitrile (compound 152) is known [CAS-Number: 22252-92-2; 62914-59-4; 62914-60-7]

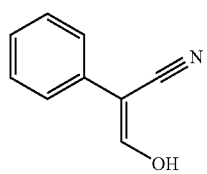

(152)

and is prepared by treating a diethyl ether solution of phenylacetonitrile with sodium hydride, followed by ethyl formate according to the following literature: A. Guzman-Perez, L. A. Maldonado *Synth. Commun.* 1991, 21, 1667-1674.

EXAMPLE 53

Acetic acid 2-cyano-2-phenyl-vinyl ester (compound 153) is known [CAS-Number: 73591-11-4]

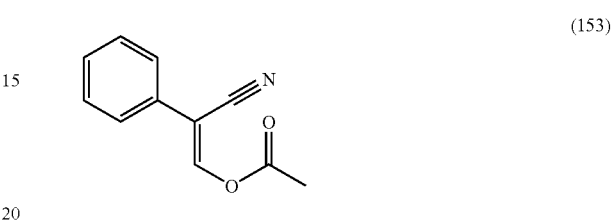

(153)

and is prepared by treating a tetrahydrofuran solution of 3-hydroxy-2-phenyl-acrylonitrile with acetic anhydride.

EXAMPLE 54

2-Phenyl-but-2-enedioic acid diethyl ester (compound 154) is known (CAS-Numbers: 5309-59-1; 40746-94-9)

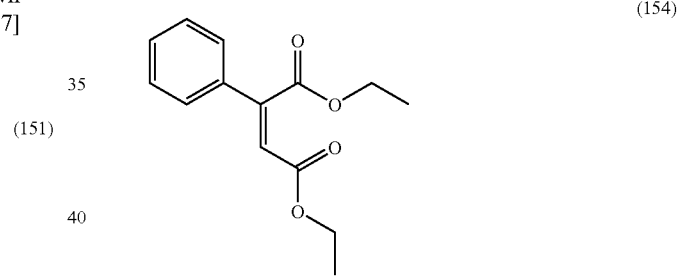

(154)

and is prepared by treating a diethyl ether suspension of NaH with (diethoxy-phosphoryl)acetic acid ethyl ester, followed by the addition of oxo-phenyl-acetic acid ethyl ester according to the following literature: R. L. N. Harris, H. G. McFadden *Aust. J. Chem.* 1984, 37, 417-424.

EXAMPLE 55

3-Phenyl-furan-2,5-dione (phenylmaleic anhydride) (compound 155) is known [CAS-Number: 36122-35-7; commercially available]

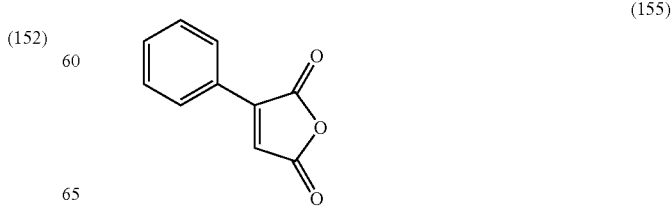

(155)

EXAMPLE 56

Preparation of Compound 156 is Known [Registered Compound in Beilstein, but No CAS-Number]

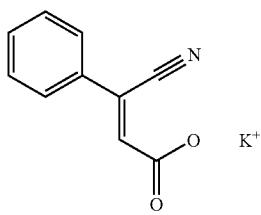
(156)

and is prepared by treating a methanol solution of phenylacetonitrile and glyoxylic acid monohydrate with potassium carbonate according to the following literature: W. D. Dean, D. M. Blum *J. Org. Chem.* 1993, 58, 7916-7917.

EXAMPLE 57

2-Benzylidene-malonic acid dimethyl ester (compound 157) is known [CAS-Number: 6626-84-2

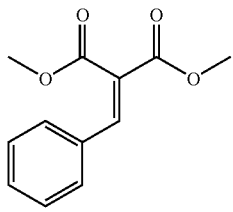
(157)

and is prepared by treating a toluene solution of dimethyl malonate and benzaldehyde with piperidine according to the following literature: V. K. Yadav, K. K: Kapoor *Tetrahedron* 1995, 51, 8573-8584.

EXAMPLE 58

2-Oxo-2H-chromene-3-carboxylic acid butyl ester (compound 158) is known [CAS-Number: 7460-87-9]

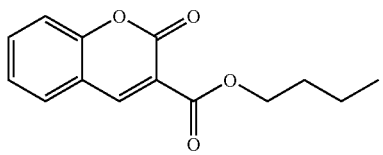
(158)

and is prepared by treating 2-oxo-2H-chromene-3-carboxylic acid with butanol under acid catalysis according to the following literature: T. Ichibagase, Y. Terada, Z. Yakugaku Zasshi *Chem. Abstr.* 1953, 6413.

EXAMPLE 59

2-Cyano-3-phenyl-acrylic acid ethyl ester (α-Cyano-cinnamic acid ethyl ester) (compound 159) is known [CAS-Number: 2025-40-3; 2169-69-9; 14533-87-0; commercially available]

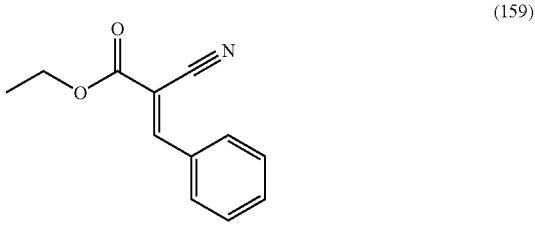
(159)

EXAMPLE 60

2-Oxo-2H-chromene-3-carbonitrile (3-cyanocoumarin, 2-Oxo-2H-1-benzopyran-3-carbonitrile) (compound 160) is known [CAS-Number: 15119-34-3; commercially available]

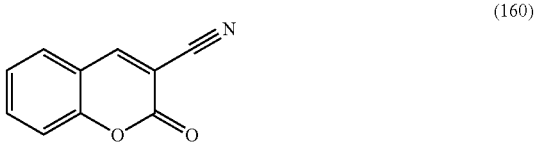 [SMILES: N#Cc1cc2ccccc2oc1=O]
(160)

and is prepared by treating an aqueous solution of dicyanomethane and salicylaldehyde with an aqueous solution of sodium hydrogenocarbonate according to the following literature: G. Brufola, F. Fringuelli, O. Piermatti, F. Pizzo *Heterocycles* 1996, 43, 1257-1266.

EXAMPLE 61

2-Benzenesulfinyl-3-phenyl-acrylic acid methyl ester (compound 161) is known [CAS-Number: 81454-68-4; 84644-16-6; 90381-86-5; 146028-93-5]

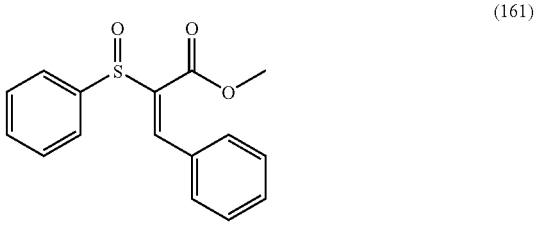 [SMILES: COC(=O)/C(=C\c1ccccc1)S(=O)c1ccccc1]
(161)

and is prepared by treating an acetonitrile solution of benzenesulfinyl-acetic acid methyl ester and benzaldehyde with piperidine according to the following literature: Z. Dong, K. A. Hellmund, S. G. Pyne *Aust. J. Chem.* 1993, 46, 1431-1436.

EXAMPLE 62

2-Benzenesulfonyl-3-phenyl-acrylic acid methyl ester (compound 162) is known [CAS-Number: 40235-45-8; 100778-02-7; 141508-71-6]

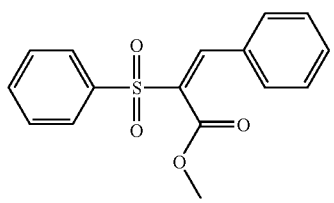

(162)

and is prepared by treating an ethanol solution of benzenesulfonyl-acetic acid methyl ester and benzaldehyde with piperidine according to the following literature: G. R. Reddy, S. V. S. A. K. Gupta, D. B. Reddy, B. Seenaiah *J. Indian Chem. Soc.* 1992, 69, 396-397.

EXAMPLE 63

2-Benzenesulfonyl-3-phenyl-acrylic acid ethyl ester (compound 163) is known [CAS-Number: 69957-40-0; 126087-62-5]

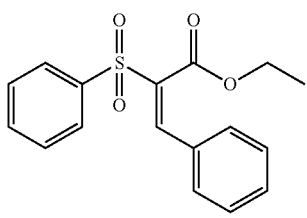

(163)

and is prepared by treating an ethanol solution of benzenesulfonyl-acetic acid ethyl ester and benzaldehyde with piperidine according to the following literature: G. R. Reddy, S. V. S. A. K. Gupta, D. B. Reddy, B. Seenaiah *J. Indian Chem. Soc.* 1992, 69, 396-397.

EXAMPLE 64

(2E)-1,3-Diphenyl-2-phenylsulfinyl-2-propen-1-one (compound 164) is known [CAS-Number: 102714-44-3; 121794-68-1]

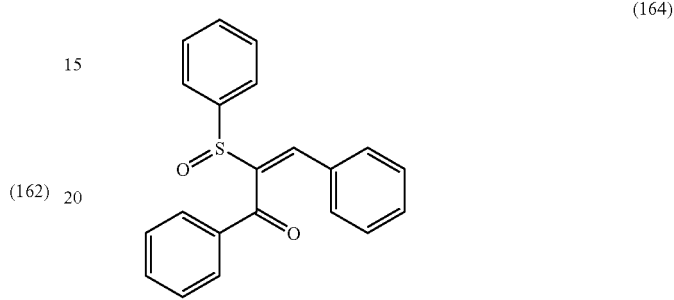

(164)

and is prepared by treating an acetonitrile solution of 2-benzenesulfinyl-1-phenyl-ethanone and benzaldehyde with piperidine according to the following literature: R. Tanikaga, N. Konya, K. Hamamura, A. Kaji *Bull. Chem. Soc. Jpn.* 1988, 61, 3211-3216.

EXAMPLE 65

2-Benzenesulfonyl-3-phenyl-acrylonitrile (α-benzenesulfonyl-cinnamonitrile) (compound 165) is known [CAS-Number: 7605-36-9; 119672-19-4; 129200-96-0]

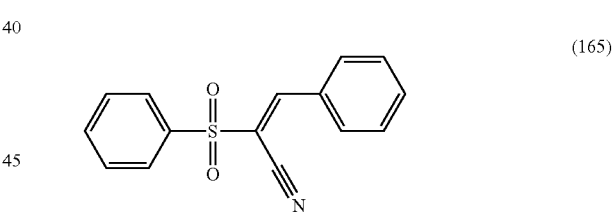

(165)

and is prepared by treating an acetonitrile solution of benzenesulfonyl-acetonitrile and benzaldehyde with piperidine according to the following literature: R. Tanikaga, N. Konya, K. Hamamura, A. Kaji *Bull. Chem. Soc. Jpn.* 1988, 61, 3211-3216.

EXAMPLE 66

Stabilization of Multiple-Extruded Polypropylene 1.3 kg of polypropylene powder (Profax 6501), which has been prestabilized with 0.025% of Irganox® 1076 (n-octadecyl 3-[3,5-di-tert-butyl-4-hydroxyphenyl]propionate) (melt index 3.2 g/10 min, measured at 230° C./2.16 kg) are blended with 0.05% of Irganox® 1010 (pentaerythritol tetrakis[3-(3,5-di-tert-butyl-4-hydroxyphenyl)propionate]), 0.05% of calcium stearate, 0.03% of DHT 4A® (Kyowa Chemical Industry Co., Ltd., [Mg$_{4.5}$Al$_2$(OH)$_{13}$CO$_3$.5H$_2$O]) and 0.015% of compound according to the invention. This blend is then extruded in an extruder having a cylinder diameter of 20 mm and a length of 400 mm at 100 rpm, the 3 heating zones being adjusted to the following temperatures: 260, 270, 280° C. The extrudate is cooled by drawing it through a water bath and is then granulated. This granulate is repeatedly extruded. After 3 extrusions, the melt index is measured (at 230° C./2.16 kg). A substantial increase in the melt index denotes pronounced chain degradation, i.e. poor stabilization. The results are summarized in Table 1.

TABLE 1

| Compound | Melt index after 3 extrusions |
|---|---|
| — | 17.9 |
| 101 | 5.1 |
| 102 | 5.4 |
| 104 | 5.2 |
| 108 | 5.3 |
| 115 | 5.2 |
| 117 | 5.4 |
| 119 | 5.3 |
| 120 | 5.3 |
| 125 | 5.2 |

EXAMPLE 67

Stabilization of Polyethylene During Processing 100 parts of polyethylene powder (Lupolen® 5260 Z) are blended with 0.05 part of Irganox® 1010 (pentaerythritol tetrakis[3-(3,5-di-tert-butyl-4-hydroxyphenyl)propionate]) and 0.05 part of a compound according to the invention and the blend is kneaded in a Brabender plastograph at 220° C. and 50 rpm. During this time the kneading resistance is recorded continuously as torque. In the course of the kneading time the polymer begins to crosslink after prolonged constancy, as can be determined by the rapid increase in torque. The time taken until a marked increase in torque is shown in Table 2 as a measure of the stabilizing action. The longer this time is the better the stabilizing action.

TABLE 2

| Compound | Time until increase in torque (min) |
|---|---|
| — | 10.2 |
| 103 | 27.9 |
| 105 | 28.0 |
| 109 | 27.8 |
| 113 | 28.0 |
| 117 | 27.9 |

EXAMPLE 68

Stabilization of Multiple-Extruded Polypropylene at High Temperature 1.5 kg of polypropylene powder (Profax 6501), which has been prestabilized with 0.008% of Irganox® 1076 (n-octadecyl 3-[3,5-di-tert-butyl-4-hydroxyphenyl]propionate) (melt index 3.2 g/10 min, measured at 230° C./2.16 kg) are blended with 0.05% of Irganox® 1010 (pentaerythritol tetrakis[3-(3, 5-di-tert-butyl-4-hydroxyphenyl)propionate]), 0.10% of calcium stearate and 0.015 to 0.100% of stabilizer or stabilizer mixture according to Table 3. This blend is then extruded in an extruder having a cylinder diameter of 20 mm and a length of 400 mm at 100 rpm, the 3 heating zones being adjusted to the following temperatures: 280, 320, 340° C. The extrudate is cooled by drawing it through a water bath and is then granulated. This granulate is repeatedly extruded. After 5 extrusions, the melt index is measured (at 230° C./2.16 kg). A substantial increase in the melt index denotes pronounced chain degradation, i.e. poor stabilization. The results are summarized in Table 3.

TABLE 3

| Stabilizers | Concentration in % (by weight) | Melt index after 5 extrusions | | |
|---|---|---|---|---|
| | | 280° C. | 320° C. | 340° C. |
| Irgafos ®168[a)] | 0.100 | 9.8 | 43.8 | 80.3 |
| Sandostab ®P-EPQ[b)] | 0.050 | 6.5 | 24.1 | 62.1 |
| Compound 110 | 0.015 | 8.3 | 19.3 | 23.4 |
| Irgafos ®168[a)] | 0.045 | 7.5 | 20.4 | 26.5 |
| Compound 110 | 0.005 | | | |
| Sandostab ®P-EPQ[b)] | 0.045 | 6.0 | 17.3 | 30.7 |
| Compound 110 | 0.005 | | | |

For footnotes [a)] and [b)] see the end of Table 12.

EXAMPLE 69

Preparation of Polyether/Polyurethane Soft Foams as Well as the Stabilization thereof Exactly 470 mg (0.3%, based on the polyol) of a stabilizer of this invention is dissolved in 157 g of an antioxidant-free polyether/polyol, Lupranol® 2045 (trifunctional polyether/polyol having primary hydroxyl groups; hydroxyl number 35 mg KOH/g, water content less than 0.1%, acid number less than 0.1 mg KOH/g). 10.24 g of a solution consisting of 1.74 g Tecostab® (polysilicone supplied by Goldschmidt, Germany], 0.48 g diazabicyclooctane (amine catalyst) and 0.8 g of water are added and the reaction mixture is stirred vigorously for 60 seconds at 100 rpm. 3.2 g of a solution of 0.32 g of tin octoate (catalyst) in 2.9 g of the above polyol is added and the reaction mixture is again stirred vigorously for 60 seconds at 100 rpm. With vigorous stirring, 98 g of an isocyanate (Lupranat®T80, supplied by BASF; toluoylene-2,4- and toluoylene-2,6-diisocyanate mixture) are then added immediately and after 6 seconds the mixture is poured into a lined mould and the exothermic temperature is measured during foaming to a foam block. The foam blocks are cooled for 24 hours in a climatic chamber at 5° C. and stored. 2 cm slices are sawed from the center of the blocks and round (cylindrical) test samples are cut therefrom using a boring tool. The samples are aged in a test tube in the presence of air at room temperature and 200° C. for 30 minutes in a preheated alu-block thermostat (dynamic heat test). The yellowing of these test samples is determined as Yellowness Index (YI) according to ASTM D-1925-77. Low YI values denote little discoloration, high YI values severe discoloration of the samples. The results are summarized in Tables 4 and 5.

TABLE 4

| Example | Concentration of stabilizers in % (by weight) | YI room temp. | YI 200° C. |
|---|---|---|---|
| 69a[i)] | — | 1.1 | 69.2 |
| 69b[k)] | 0.15% Compound 109 0.15% Irganox ®5057[c)] | −0.9 | 1.9 |
| 69c[k)] | 0.15% Compound 116 0.15% Irganox ®5057[c)] | −0.9 | 1.8 |

TABLE 4-continued

| Example | Concentration of stabilizers in % (by weight) | YI room temp. | YI 200° C. |
|---|---|---|---|
| 69d[k] | 0.15% Compound 119<br>0.15% Irganox ®5057[c] | −1.0 | 1.9 |

TABLE 5

| Example | Concentration of stabilizers in % (by weight) | YI room temp. | YI 200° C. |
|---|---|---|---|
| 69e[i] | — | 1.0 | 69.3 |
| 69f[k] | 0.10% Compound 109<br>0.10% Irganox ®5057[c]<br>0.10% Irganox ®1135[d] | −1.0 | 2.1 |
| 69g[k] | 0.10% Compound 116<br>0.10% Irganox ®5057[c]<br>0.10% Irganox ®1135[d] | −0.9 | 1.9 |
| 69h[k] | 0.10% Compound 119<br>0.10% Irganox ®5057[c]<br>0.10% Irganox ®1135[d] | −1.0 | 2.0 |

For footnotes [c], [d], [i] and [k] see the end of Table 12.

EXAMPLE 70

Stabilizing Polypropylene Fibers Processed at 300° C.

2.0 kg of polypropylene powder (B 10 FB® from Polychim S.A., France), which has a melt index of 12.0 g/dmin measured in accordance with DIN 53735 at 230° C. under 2.16 kg, is homogenized with 0.05% of calcium stearate and with the stabilizers indicated in Table 6 and 7 for 2 minutes in a high-speed mixer. This mixture is extruded at 60 revolutions per minute in an extruder having a barrel diameter of 20 mm and a length of 400 mm, the three heating zones being set at the following temperatures: 200, 220 and 220° C. The extrudate is passed through a water bath for cooling and then granulated. These granules are processed to give a multifilament fiber. This is done using a single-screw extruder with a melt pump and a 37-hole spinning head. The maximum processing temperature is 300° C.

A portion of the unstretched fiber thus obtained is pressed for 6 minutes at 230° C. to form a sheet with a thickness of 2 mm. The melt index (MFI, melt flow index) of this sheet is measured in accordance with DIN 53735 at 230° C. and 2.16 kg. A large increase in the melt index denotes severe chain degradation and thus poor stabilization. The results are compiled in Table 6.

Another portion of the unstretched fiber thus obtained is treated with a lubricant (Limanol® P 25, Schill und Seilacher, Böblingen, Germany) and subjected to preliminary drawing. This preliminary drawing leads to a fiber strand having a linear density of 416 g/90 m. This means that a fiber strand 90 m in length has a weight of 416 g. In a further operation, this fiber strand is again drawn at 120° C. by a factor of 3.2 using a drawing apparatus. This leads to a fiber strand having a linear density of 130 g/90 m.

A portion of this fiber strand is used to produce a knitted tube. The yellowness index ($YI_1$) of this knitted tube is determined in accordance with ASTM D 1925-77. Low $YI_1$ values denote little discoloration, high $YI_1$ values severe discoloration of the samples. The results are compiled in Table 7. This knitted tube is exposed in the presence of from 4 to 6 ppm nitrogen dioxide ($NO_2$) at 40° C. and 87% relative atmospheric humidity for 48 hours in accordance with AATCC 164. The yellowness index ($YI_2$) of this exposed knitted tube is determined in accordance with ASTM D 1925-77. Low $YI_2$ values denote little discoloration, high $YI_2$ values severe discoloration of the samples. The results are compiled in Table 6.

Another portion of the fiber strand is used to carry out an oven ageing test at 100° C. In this test, a measurement is made, in days, of the time taken for the fiber strand to tear under the test conditions. The longer the period before tearing of the fiber strand, the better the stabilization. The results are compiled in Table 7.

Another portion of the unstretched fiber is pressed for 6 minutes at 230° C. to form a thin film with a thickness of 0.10 mm. This film is subjected to a Xenon test in accordance with DIN 53387. In this test, the film is exposed in a Xenon 1200 weathering apparatus until a carbonyl index of 0.25 is observed in the wavelength range from 1760 to 1680 $cm^{-1}$. The larger the number, the better the stabilization. The results are compiled in Table 7.

TABLE 6

| Example | Stabilizers | $YI_1$ after spinning | $YI_2$ after $NO_2$ exposure | MFI after spinning |
|---|---|---|---|---|
| 70a[i] | — | 0.3 | 1.3 | 108.0 |
| 70b[k] | 0.100% Compound 124<br>0.050% Tinuvin ®622[e] | 1.3 | 4.2 | 32.1 |
| 70c[k] | 0.100% Compound 124<br>0.050% Chimassorb ®944[f] | 1.4 | 4.2 | 32.2 |
| 70d[k] | 0.100% Compound 124<br>0.050% Chimassorb ®119[g] | 1.3 | 4.1 | 32.1 |
| 70e[k] | 0.075% Compound 124<br>0.050% Tinuvin ®622[e]<br>0.075% Irgafos ®168[a] | 0.9 | 4.0 | 32.2 |
| 70f[k] | 0.075% Compound 124<br>0.050% Chimassorb ®944[f]<br>0.075% Irgafos ®168[a] | 1.3 | 4.2 | 32.1 |
| 70g[k] | 0.075% Compound 124<br>0.050% Chimassorb ®944[f]<br>0.075% Irgafos ®38[h] | 1.3 | 4.2 | 32.3 |
| 70h[k] | 0.075% Compound 124<br>0.050% Chimassorb ®119[g]<br>0.075% Irgafos ®168[a] | 1.3 | 4.3 | 32.1 |

For footnotes [a], [e], [f], [g], [h], [i] and [k] see the end of Table 12.

TABLE 7

| Example | Stabilizers | Oven ageing (days) | Xenon test (hours) |
|---|---|---|---|
| 70a[i] | — | 1 | 198 |
| 70c[k] | 0.100% Compound 124<br>0.050% Chimassorb ®944[f] | 38 | 1360 |
| 70d[k] | 0.100% Compound 124<br>0.050% Chimassorb ®119[g] | 39 | 1410 |
| 70f[k] | 0.075% Compound 124<br>0.050% Chimassorb ®944[f]<br>0.075% Irgafos ®168[a] | 39 | 1370 |
| 70g[k] | 0.075% Compound 124<br>0.050% Chimassorb ®944[f]<br>0.075% Irgafos ®38[h] | 39 | 1370 |
| 70h[k] | 0.075% Compound 124<br>0.050% Chimassorb ®119[g]<br>0.075% Irgafos ®168[a] | 39 | 1420 |

For footnotes [a], [f], [g], [h], [i] and [k] see the end of Table 12.

EXAMPLE 71

Preparation of Polyolefin Hollow Articles by the Rotomolding Process

100 Parts of low density polyethylene, copolymerized with hexene (PE-LLD), type Quantum® Petrothene® GA-635-661, having a melt flow index of 6.5 g/10 min and a density of 0.935 g/cm$^3$, are mixed with 0.170 part of Chimassorb® 944 [formula see footnote f) after Table 12], 0.050 part of zinc stearate and the stabilizers cited in Tables 8 and 9 at 232° C. in a Superior/MPM Extruder, fitted with a 24:1 Maddock type L/D screw, at 100 revolutions per minute. The polymer is then ground. The particle size of the polymer is from 150 to 500 µm. Owing to the larger surface of the particles obtained by grinding, the heat can be absorbed faster, which goes hand in hand with a lower energy consumption.

The actual rotomolding process or rotational molding process, which permits the production of fairly large three-dimensional solids, is carried out in a Clamshell type rotomolder FSP M20. In this machine, an aluminium mold, which is mounted on an arm and into which the plastic sample is filled, is heated with a gas burner with circulation of the hot air over 5 minutes to 316° C., or over 6 minutes to 329° C., and is then kept at this temperature for a specific time (see Tables 9 and 10). Subsequently, the oven is opened and the mold is cooled first for 7 minutes with circulating air, then for 7 minutes by spraying with water and finally for another 2 minutes with circulating air. During the entire heating and cooling process, the mold, which is mounted on two axes at right angles to each other, is rotated, the speed of the main axis being kept at 6 revolutions per minute and the rotational ratio being 4.5:1. After cooling, the lid of the mold is opened and the resultant hollow article is taken out. The yellowness index (YI) of the exterior of the molded articles is determined according to ASTM D 1925-70. Low YI values denote little discoloration, high YI values strong discoloration of the samples. The less discoloration, the more effective the stabilizer. The results are summarized in Tables 8 and 9.

TABLE 8

Rotomolding at 316° C.

| | | Yellowness Index after | |
|---|---|---|---|
| Examples | Stabilizer | 8 minutes | 10 minutes |
| Example 71a[j] | 0.05% Irganox ® 1010[f] 0.10% Irgafos ®168[a] | 6.4 | 18.0 |
| Example 71b[k] | 0.02% compound 125 0.08% Irgafos ®168[a] | 4.9 | 5.8 |

TABLE 9

Rotomolding at 329° C.

| | | Yellowness Index after | |
|---|---|---|---|
| Examples | Stabilizer | 6 minutes | 8 minutes |
| Example 71c[j] | 0.05% Irganox ® 1010[f] 0.10% Irgafos ®168[a] | 4.0 | 16.7 |
| Example 71d[k] | 0.02% compound 125 0.08% Irgafos ®168[a] | 4.1 | 7.2 |

For footnotes [a], [f], [k] and [j] see the end of Table 12.

EXAMPLE 72

Stabilisation of Polyethylene which is in Permanent Contact with Water 0.10% by weight of calcium stearate and a stabilizer mixture comprising 0.10% by weight of Irganox® 1010 (pentaerythritol tetrakis[3-(3,5-di-tert-butyl-4-hydroxyphenyl)propionate]), 0.05% by weight of Irgafos® 168 (tris(2,4-di-tert-butylphenyl)phosphite) and 0.05% by weight of compound 120 is added dry to a polyethylene polymer (Hostalene® CRP 100; PE-HD) taken direct from a reactor and are incorporated therein in a Pappenmaier mixer (type 20) within 2 minutes.

In an extruder, of Schwabenthan, the stabilized polyethylene is homogenised and processed to granulate. For the extraction tests in water, 200 mm by 150 mm by 2 mm test plates are pressed from the granulate of the individual formulations using a table press. To ease the demoulding of the test plates, the pressing process is carried out between two aluminium foils.

The stabilizer extraction tests are carried out with deionised water. Preliminary heating of the extraction vessels is carried out in a circulating air oven, of Heraeus (Hanau, Germany), at a maximum temperature deviation of 1.5° C. Glass vessels are used for extraction tests below the boiling point of water, such as at 80° C. Owing to the risk of over-saturating the water with stabilizers, the amount of liquid used for the tests is fixed at c. 400 ml per c. 70 g of polymer and the water is replaced with fresh water at regular intervals, i.e. whenever a sample is taken.

The test plates are subjected to the above test conditions for 50 days at 80° C. Upon termination of the extraction test, the residual stabilizer content and the oxidation induction time of the test plates are determined.

The residual content of sterically hindered phenol, Irganox® 1010, is determined using an internal standard in an HPLC appliance of the Spectra Physics SP 8800 type, equipped with autosampler and UV/VIS detector of the Spectra 200 type. The chromatography is carried out at room temperature using a Hyperchrome 125×4.6 mm type column which is filled with Nucleosil C 185 µm. The injection volume is 14 µl at a flow rate of 1.5 ml/minute. UV detection takes place at 270 nm.

The oxidation induction time which is determined using a "DuPont-instrument 910 Differential Scanning Calorimeter", of TA Instruments (Alzenau, Germany), and taking a 5 to 10 mg amount of sample, describes the time in minutes at constant thermal stress (190° C./O$_2$) up to the start of the complete degradation of the polyethylene sample. The longer the oxidation induction time, the better stabilized the polyethylene and the more stable is the polyethylene against extracting water with which it is in permanent contact. The results show that the stability of polyolefins which are in permanent contact with extracting media is improved if they contain a compound of the formula I according to the instant invention as stabilizer.

EXAMPLE 73

Stabilization of Polycarbonate 1.0 kg of a polycarbonate powder which has been dried for 8 hours at 120° C. in a vacuum drying oven (Lexan® 115, of General Electric) and 0.1 to 0.6 g (0.01 to 0.06%) of the stabilizers listed in Table 10 are mixed for 2 minutes in a Henschel mixer. This mixture is then extruded in a Schwabenthan extruder at a maximum of 280° C. The polymer string is then granulated. Using an injection moulding machine, plates having a layer thickness of 2 mm are then moulded from the granulate so obtained at a maximum of 300° C. These plates are then aged in a circulating air oven at 135° C. for 2000 hours. The yellowness index (YI) of these plates is then determined according to ASTM D 1925-70 and the transmission is determined in percent at 450 nm. Low YI values denote little discoloration, high YI values high discoloration of the patterns. The less discoloration, the more effective the stabilizer. The higher the transmission values, the more effective the stabilizer. The results are compiled in Tables 10 and 11.

TABLE 10

| Example | Stabilizers | Yellowness index prior to oven-ageing | Yellowness index after 2000 hours at 135° C. |
|---|---|---|---|
| 73a[i] | — | 4.3 | 25.5 |
| 73b[i] | 0.05% Irgafos ®168[a] | 3.4 | 22.7 |
| 73c[k] | 0.01% Compound 102 | 3.4 | 16.5 |
| 73d[k] | 0.01% Compound 103 | 3.4 | 16.1 |
| 73e[k] | 0.05% Irgafos ®168[a] 0.01% Compound 102 | 3.4 | 15.4 |
| 73f[k] | 0.05% Irgafos ®168[a] 0.01% Compound 103 | 3.4 | 15.5 |

TABLE 11

| Example | Stabilizers | Transmission in % prior to oven-aging | Transmission in % after 2000 hours at 135° C. |
|---|---|---|---|
| 73a[i] | — | 84.3 | 76.4 |
| 73b[i] | 0.05% Irgafos ®168[a] | 84.5 | 77.8 |
| 73c[k] | 0.01% Compound 102 | 85.5 | 81.3 |
| 73d[k] | 0.01% Compound 103 | 85.6 | 81.4 |
| 73e[k] | 0.05% Irgafos ®168[a] 0.01% Compound 102 | 85.7 | 81.6 |
| 73f[k] | 0.05% Irgafos ®168[a] 0.01% compound 103 | 85.7 | 81.8 |

For footnotes [a], [i] and [k] see the end of Table 12.

EXAMPLE 74

Stabilization of Polyesters 2.5 kg of a polyester which has been dried for 12 hours at 120° C. in a vacuum drying oven (Polyclear® T86, of Hoechst) is charged with the stabilizer listed in Table 12 and is mixed for 2 hours in a Henschel mixer. This mixture is then extruded in a Schwabenthan extruder at a maximum of 275° C. The polymer string is then granulated. The granulate so obtained is dried for another 12 hours in a vacuum drying oven. In a double determination, 500 mg of the granulate is heated over 10 minutes to 290° C. and is stored for 1 hour under pure oxygen in a rancimate at 290° C. The resulting gaseous separation products are continuously led into an aqueous collecting solution and the conductivity (AS) of this solution is continuously measured. Low conductivity values signify that few separation products are formed, high conductivity values signify that very many separation products are formed. The lower the conductivity values, the more effective the stabilizer. The results are compiled in Table 12.

TABLE 12

| Example | Stabilizers | Conductivity (µS) |
|---|---|---|
| 74a[i] | — | 49 |
| 74b[k] | 0.20% Compound 102 | 36 | a) Irgafos ®168 (Ciba Specialty Chemicals Inc.) is tris(2,4-di-tert-butylphenyl)phosphite.
b) Sandostab ®P-EPQ (Clariant) is tetrakis(2,4-di-tert-butylphenyl)-4,4'-biphenylene diphosphonite.
c) Irganox ®5057 (Ciba Specialty Chemicals Inc.) is a secondary amine antioxidant and is a technical mixture, obtained by reaction of diphenylamine with diisobutylene, comprising
a') 3% of diphenylamine;
b') 14% of 4-tert-butyldiphenylamine;
c') 30% of compounds of the group
  i) 4-tert-octyldiphenylamine,
  ii) 4,4'-di-tert-butyldiphenylamine,
  iii) 2,4,4'-tris-tert-butyldiphenylamine;
d') 29% of the compounds of the group
  i) 4-tert-butyl-4'-tert-octyldiphenylamine,
  ii) o,o'-, m,m'- or p,p'-di-tert-octyldiphenylamine,
  iii) 2,4-di-tert-butyl-4'-tert-octyldiphenylamine;
e') 24% of the compounds of the group
  i) 4,4'-di-tert-octyldiphenylamine and
  ii) 2,4-di-tert-octyl-4'-tert-butyldiphenylamine.
d) Irganox ®1135 (Ciba Specialty Chemicals Inc.) is a phenolic antioxidant of the formula A-1.

$$\text{HO}-\underset{(CH_3)_3C}{\overset{(CH_3)_3C}{\bigcirc}}-CH_2-CH_2-\overset{O}{\underset{\|}{C}}-O\text{-iso-}C_8H_{17}$$

(A-1)

e) Tinuvin ®622 (Ciba Specialty Chemicals Inc.) is a compound of the formula H1 in which the average molecular weight is about 3000.

(H1)

f) Chimassorb ®944 (Ciba Specialty Chemicals Inc.) denotes linear or cyclic condensation products prepared from N,N'-bis(2,2,6,6-tetramethyl-4-piperidyl)hexamethylendiamine and 4-tert-octylamino-2,6-dichloro-1,3,5-triazine and is a compound of the formula H2 in which the average molecular weight is about 2500.

(H2)

g) Chimassorb ®119 (Ciba Specialty Chemicals Inc.) denotes condensation products prepared from 2-chloro-4,6-di(4-n-butylamino-1,2,2,6,6-pentamethylpiperidyl)-1,3,5-triazine and 1,2-bis(3-aminopropylamino)ethane and is a compound of the formula H3

$$R'-NH-(CH_2)_3-\underset{|}{\overset{R'}{N}}-(CH_2)_2-\underset{|}{\overset{R'}{N}}-(CH_2)_3-NH-R'$$

(H3)

TABLE 12-continued

| Example | Stabilizers | Conductivity (μS) |
|---------|-------------|-------------------|

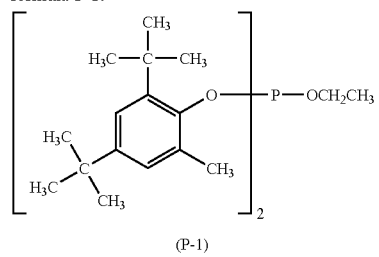

h) Irgafos ®38 (Ciba Specialty Chemicals Inc.) is a compound of the formula P-1.

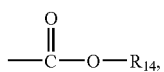

(P-1)

i) Comparison Example.
k) Example of this invention.
l) Irganox ®1010 (Ciba Specialty Chemicals Inc.) denotes the pentaerythritol ester of 3-(3,5-di-tert-butyl-4-hydroxyphenyl)propionic acid.

What is claimed is:

1. A process for stabilizing an organic material against oxidative, thermal or light-induced degradation, which process comprises incorporating therein or applying thereto at least one compound of formula I and at least one further additive selected from the group consisting of phenolic antioxidants, light stabilizers and organic phosphites or phosphonites,

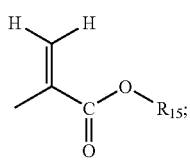 (I)

wherein $R_0$ is

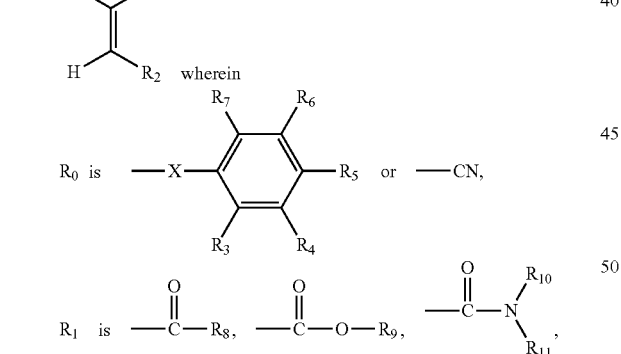

$R_1$ is

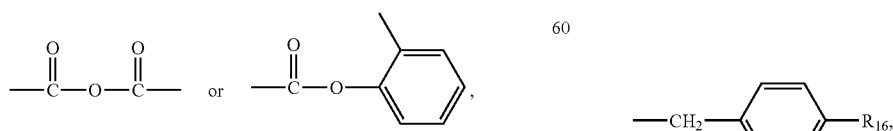

$—S—R_{12}$, $—SO—R_{12}$, $—SO_2—R_{12}$ or $—CN$; or $R_1$ and $R_2$ form together

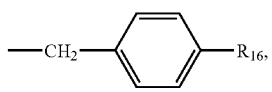

$R_2$ is hydrogen, $—S—R_{13}$, $—SO—R_{13}$, $—SO_2—R_{13}$, unsubstituted or $C_1$-$C_4$alkyl substituted phenyl;

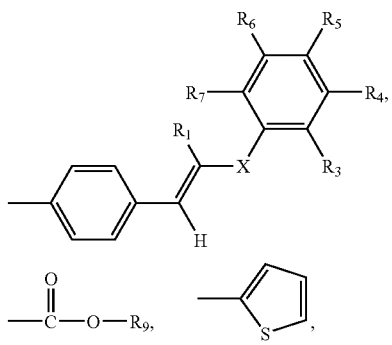

hydroxy or $C_1$-$C_{25}$ alkanoyloxy, $R_3$, $R_4$, $R_5$, $R_6$ and $R_7$ independently of each other are hydrogen, $C_1$-$C_{25}$ alkyl, halogen, trifluoromethyl, nitro, $C_1$-$C_{25}$ alkoxy, $C_1$-$C_{25}$ phenylalkyl, phenyl or or each pair of substituent $R_3$ and $R_4$ or $R_4$ and $R_5$ or $R_5$ and $R_6$ or $R_6$ and $R_7$, together with the linking carbon atoms, forms a benzene ring; and with the proviso that at least one of the radicals from the groups of $R_3$ to $R_7$ is hydrogen;

$R_6$ is hydrogen, $C_1$-$C_{25}$ alkyl, $C_7$-$C_9$ phenylalkyl, unsubstituted or $C_1$-$C_4$ alkyl-substituted phenyl; unsubstituted or $C_1$-$C_4$ alkyl-substituted $C_5$-$C_8$ cycloalkyl;

$R_9$ is hydrogen, alkali metal, $C_1$-$C_{25}$ alkyl, $C_7$-$C_9$ phenylalkyl, unsubstituted or $C_1$-$C_{25}$ alkyl which is interrupted by oxygen or sulfur;

benzhydryl or

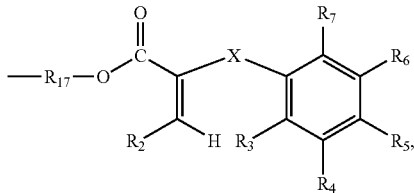

$R_{10}$ and $R_{11}$ independently of one another are hydrogen, $C_1$-$C_{25}$ alkyl, $C_7$-$C_9$ phenylalkyl, unsubstituted or $C_1$-$C_4$ alkyl-substituted phenyl; unsubstituted or $C_1$-$C_4$ alkyl-substituted $C_5$-$C_8$ cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$ alkyl or is interrupted by oxygen, sulfur or

$R_{12}$ is hydrogen, $C_1$-$C_{25}$ alkyl, $C_7$-$C_9$ phenylalkyl, unsubstituted or $C_1$-$C_4$ alkyl-substituted phenyl; or unsubstituted or $C_1$-$C_4$ alkyl-substituted $C_5$-$C_8$ cycloalkyl;
$R_{13}$ is hydrogen, $C_1$-$C_{25}$ alkyl, $C_7$-$C_9$ phenylalkyl, unsubstituted or $C_1$-$C_4$ alkyl-substituted phenyl; or unsubstituted or $C_1$-$C_4$ alkyl-substituted $C_5$-$C_8$ cycloalkyl;
$R_{14}$ is $C_1$-$C_{25}$ alkyl, $C_7$-$C_9$ phenylalkyl, unsubstituted or $C_1$-$C_4$ alkyl-substituted phenyl; or unsubstituted or $C_1$-$C_4$ alkyl-substituted $C_5$-$C_8$ cycloalkyl;
$R_{15}$ is $C_1$-$C_{25}$ alkyl or $C_7$-$C_9$ phenylalkyl,
$R_{16}$ is

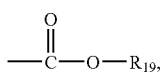

halogen or nitro,
$R_{17}$ is $C_2$-$C_{18}$ alkylene, $C_4$-$C_{18}$ alkylene which is interrupted by oxygen, sulfur or

$C_2$-$C_{18}$ alkenylene, $C_2$-$C_{20}$ alkylidene, $C_7$-$C_{20}$ phenylalkylidene, $C_5$-$C_8$ cycloalkylene, $C_7$-$C_8$ bicycloalkylene, unsubstituted or $C_1$-$C_4$ alkyl-substituted phenylene;
$R_{18}$ is hydrogen, $C_1$-$C_8$ alkyl or benzyl,
$R_{19}$ is $C_1$-$C_{25}$ alkyl or $C_7$-$C_9$ phenylalkyl,
X is a direct bond, —SO— or —$SO_2$— and
when $R_1$ is

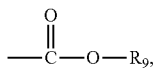

$R_2$ is hydrogen, $R_0$ is

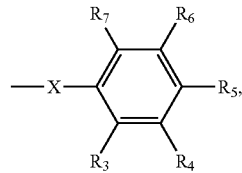

X is a direct bond and $R_3$, $R_4$, $R_5$, $R_6$ and $R_7$ are each hydrogen, $R_9$ is selected from the group consisting of propyl, isopropyl, n-butyl, sec-butyl, isobutyl, tert-butyl, 2- ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl, and where the organic material is selected from the group consisting of lubricants, polypropylene, polyethylene, ethylene/propylene copolymers, polyacetals, polyurethanes, polycarbonates and polyesters derived from dicarboxylic acids and diols and/or from hydroxycarboxylic acids or the corresponding lactones, and where the compound of formula I is present in an amount of from 0.0005 to 10% based on the weight of the organic material.

2. A process according to claim 1, wherein
$R_0$ is

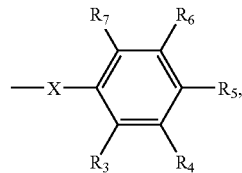

$R_1$ is

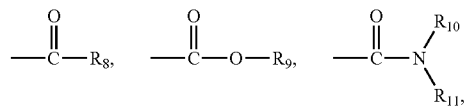

—S—$R_{12}$, —SO—$R_{12}$, —$SO_2$—$R_{12}$ or —CN;
or $R_1$ and $R_2$ form together

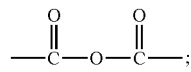

$R_2$ is hydrogen, —S—$R_{13}$, —SO—$R_{13}$, —$SO_2$—$R_{13}$, unsubstituted or $C_1$-$C_4$ alkyl substituted phenyl; or

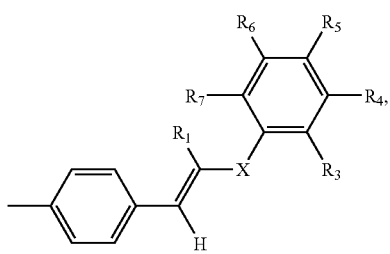

R$_3$, R$_4$, R$_5$, R$_6$ and R$_7$ independently of each other are hydrogen, C$_1$-C$_{25}$ alkyl, halogen, trifluoromethyl, C$_1$-C$_{25}$ alkoxy,

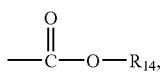

C$_7$-C$_9$ phenylalkyl, phenyl or

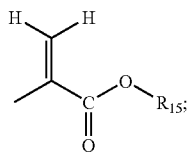

or each pair of substituent R$_3$ and R$_4$ or R$_4$ and R$_5$ or R$_5$ and R$_6$ or R$_6$ and R$_7$, together with the linking carbon atoms, forms a benzene ring; and with the proviso that at least one of the radicals from the group of R$_3$ to R$_7$ is hydrogen;
R$_8$ is hydrogen, C$_1$-C$_{25}$ alkyl, C$_7$-C$_9$ phenylalkyl, unsubstituted or C$_1$-C$_4$ alkyl-substituted phenyl; unsubstituted or C$_1$-C$_4$ alkyl-substituted C$_5$-C$_8$ cycloalkyl;
R$_9$ is hydrogen, C$_1$-C$_{25}$ alkyl, C$_7$-C$_9$ phenylalkyl, unsubstituted or C$_1$-C$_4$ alkyl-substituted phenyl; unsubstituted or C$_1$C$_4$ alkyl-substituted C$_5$-C$_8$ cycloalkyl; C$_3$-C$_{25}$ alkyl which is interrupted by oxygen or sulfur;

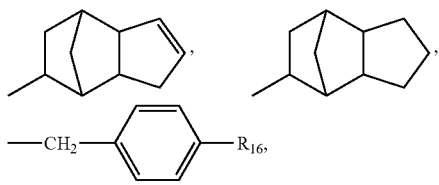

benzhydryl or

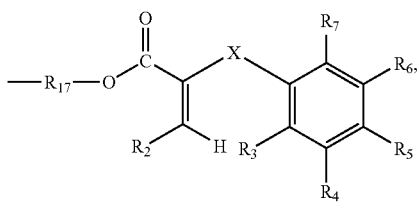

R$_{10}$ and R$_{11}$ independently of one another are hydrogen, C$_1$-C$_{25}$ alkyl, C$_7$-C$_9$ phenylalkyl, unsubstituted or C$_1$-C$_4$alkyl-substituted phenyl; unsubstituted or C$_1$-C$_4$ alkyl-substituted C$_5$C$_8$ cycloalkyl; or R$_{10}$ and R$_{11}$, together with the nitrogen atom to which they are attached, form a 5-, 6- or 7-membered heterocyclic ring which is unsubstituted or is substituted by C$_1$-C$_4$ alkyl or is interrupted by oxygen, sulfur or

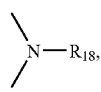

R$_{12}$ is hydrogen, C$_1$-C$_{25}$ alkyl, C$_7$-C$_9$ phenylalkyl, unsubstituted or C$_1$-C$_4$ alkyl-substituted phenyl; or unsubstituted or C$_1$-C$_4$ alkyl-substituted C$_5$-C$_8$ cycloalkyl;
R$_{13}$ is hydrogen, C$_1$-C$_{25}$ alkyl, C$_7$-C$_9$ phenylalkyl, unsubstituted or C$_1$-C$_4$ alkyl-substituted phenyl; or unsubstituted or C$_1$-C$_4$ alkyl-substituted C$_5$-C$_8$ cycloalklyl;
R$_{14}$ is C$_1$-C$_{25}$ alkyl, C$_7$-C$_9$ phenylalkyl, unsubstituted or C$_1$-C$_4$ alkyl-substituted phenyl; or unsubstituted or C$_1$-C$_4$ alkyl-substituted C$_5$-C$_8$ cycloalkyl;
R$_{15}$ is C$_1$-C$_{25}$ alkyl, C$_7$-C$_9$ phenylalkyl,
R$_{16}$ is

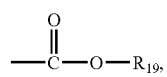

halogen or nitro,
R$_{17}$ is C$_2$-C$_{18}$ alkylene, C$_4$-C$_{18}$ alkylene which is interrupted by oxygen, sulfur or

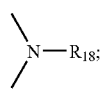

C$_2$-C$_{18}$ alkenylene, C$_2$-C$_{20}$ alkylidene, C$_7$-C$_{20}$ phenylalkylidene, C$_5$-C$_8$ cycloalkylene, C$_7$-C$_8$ bicycloalkylene, unsubstituted or C$_1$-C$_4$ alkyl-substituted phenylene;
R$_{18}$ is hydrogen, C$_1$-C$_8$ alkyl or benzyl,
R$_{19}$ is C$_1$-C$_{25}$ alkyl or C$_7$-C$_9$ phenylalkyl and
X is a direct bond, —SO— or —SO$_2$—.
3. A process according to claim 2, wherein R$_3$, R$_4$, R$_6$ and R$_7$ are hydrogen.
4. A process according to claim 2, wherein
R$_5$ is hydrogen, trifluoromethyl,

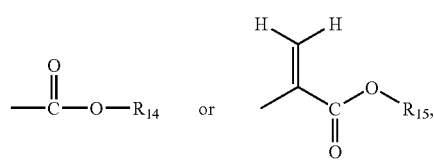

R$_{14}$ is C$_1$-C$_{18}$ alkyl and
R$_{15}$ is C$_1$-C$_{18}$ alkyl.

5. A process according to claim 1, wherein $R_0$ is

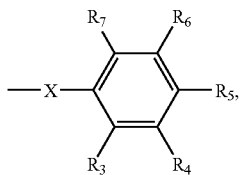

$R_1$ is

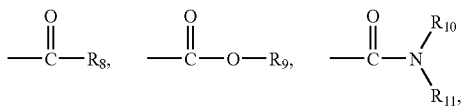

—S—$R_{12}$, —SO—$R_{12}$, —$S_2$—$R_{12}$ or —CN, $R_2$ is hydrogen, —S—$R_{13}$, —SO—$_{13}$, —$S_2$—$R_{13}$, unsubstituted or $C_1$-$C_4$ alkyl substituted phenyl; or

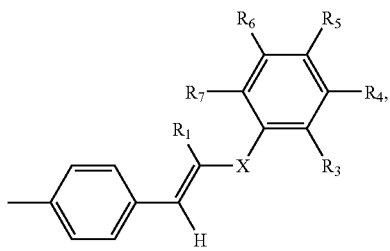

$R_3$, $R_4$, $R_5$, $R_6$ and $R_7$ independently of each other are hydrogen, $C_1$-$C_{18}$ alkyl, chloro, bromo, nitro, trifluoromethyl, $C_1$-$C_{18}$alkoxy,

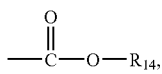

benzyl, phenyl or

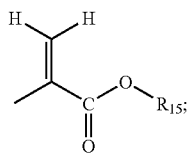

and with the proviso that at least one of the radicals from the group of $R_3$ to $R_7$ is hydrogen;

$R_8$ is hydrogen, $C_1$-$C_{18}$ alklyl, $C_7$-$C_9$ phenylalkyl, phenyl or $C_5$-$C_8$ cycloalkyl, $R_9$ is hydrogen, $C_1$-$C_{18}$ alkyl, $C_7$-$C_9$ phenylalkyl, phenyl, cyclohexyl, $C_3$-$C_{18}$ alkyl which is interrupted by oxygen;

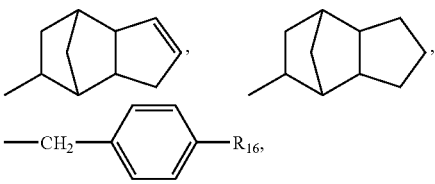

benzhydryl or

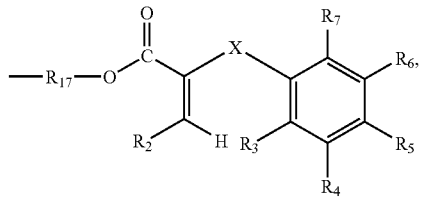

$R_{10}$ and $R_{11}$ independently of one another are hydrogen, $C_1$-$C_{18}$ alkyl, $C_7$-$C_9$ phenylalkyl, phenyl or $C_5$-$C_8$ cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$ alkyl;

$R_{12}$ is $C_1$-$C_{18}$ alkyl, $C_7$-$C_9$ phenylalkyl, phenyl or $C_5$-$C_8$ cycloalkyl, $R_{13}$ is $C_1$-$C_{18}$ alkyl, $C_7$-$C_9$ phenylalkyl, phenyl or $C_5$-$C_8$ cycloalkyl, $R_{14}$ is $C_1$-$C_{18}$ alkyl, benzyl, phenyl or $C_5$-$C_8$ cycloalkyl, $R_{15}$ is $C_1$-$C_{18}$ alkyl or benzyl, $R_{16}$ is

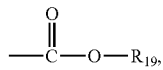

chloro, bromo or nitro, $R_{17}$ is $C_2$-$C_{18}$ alkylene, $C_4$-$C_{18}$ alkylene which is interrupted by oxygen or sulfur; $C_2$-$C_{18}$ alkenylene, $C_2$-$C_{12}$ alkylidene, $C_7$-$C_{20}$ phenylalkylidene, $C_5$-$C_8$ cycloalkylene, $C_7$-$C_8$ bicycloalkylene or phenylene, $R_{19}$ is $C_1$-$C_{18}$ alkyl or benzyl, X is a direct bond, —SO— or —$SO_2$— and when $R_1$ is

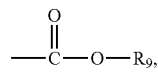

$R_2$ is hydrogen, X is a direct bond and $R_3$, $R_4$, $R_5$, $R_6$ and $R_7$ are each hydrogen, $R_9$ is selected from the group consisting of propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

6. A process according to claim 1, wherein $R_0$ is

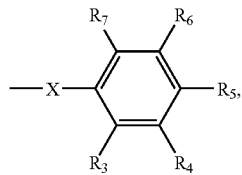

$R_1$ is

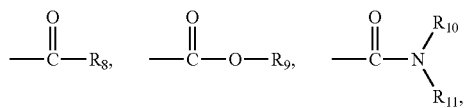

—S—$R_{12}$, —SO—$R_{12}$, —$SO_2$—$R_{12}$ or —CN,
$R_2$ is hydrogen, —S—$R_{13}$, —SO—$R_{13}$, —$SO_2R_{13}$, phenyl or

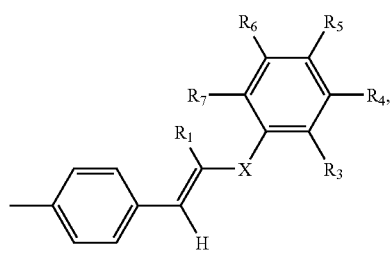

$R_3$, $R_4$, $R_5$, $R_6$ and $R_7$ independently of each other are hydrogen, $C_1$-$C_{12}$ alkyl, chloro, nitro trifluoromethyl, $C_1$-$C_{12}$ alkoxy,

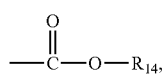

benzyl, phenyl or

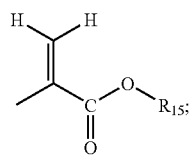

and with the proviso that at least one of the radicals from the group of $R_3$ to $R_7$ is hydrogen;

$R_8$ is $C_1$-$C_{12}$ alklyl, benzyl, phenyl or cyclohexyl,
$R_9$ is $C_1$-$C_{18}$ alkyl, $C_7$-$C_9$ phenylalkyl, phenyl, cyclohexyl, $C_4$-$C_{12}$ alkyl which is interrupted by oxygen;

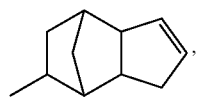 , 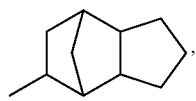 ,

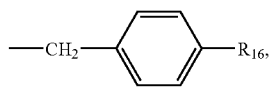

benzhydryl or

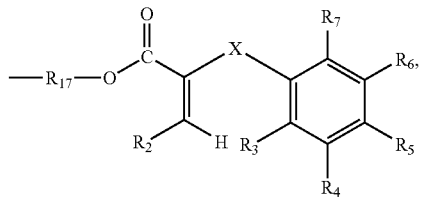

$R_{10}$ and $R_{11}$ independently of one another are hydrogen, $C_2$-$C_{12}$ alkyl, benzyl or cyclohexyl, or $R_{10}$ and $R_{11}$, together with the nitrogen atom to which they are attached, form a 5-, 6- or 7-membered heterocyclic ring;

$R_{12}$ is $C_1$-$C_{12}$ alkyl, benzyl, phenyl or cyclohexyl,
$R_{13}$ is $C_1$-$C_{12}$ alkyl, benzyl, phenyl or cyclohexyl,
$R_{14}$ is $C_1$-$C_{12}$ alkyl, benzyl, phenyl or cyclohexyl,
$R_{15}$ is $C_1$-$C_{12}$ alkyl or benzyl, $R_{16}$ is

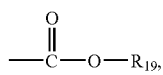

chloro or nitro,
$R_{17}$ is $C_2$-$C_{12}$ alkylene, $C_4$-$C_{18}$ alkylene which is interrupted by oxygen; $C_2$-$C_{12}$ alkenylene, $C_2$-$C_{12}$ alkylidene, $C_5$-$C_8$ cycloalkylene or phenylene
$R_{19}$ is $C_1$-$C_{12}$ alkyl or benzyl,
X is a direct bond, —SO— or —$SO_2$— and when $R_1$ is

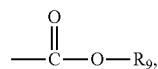

$R_2$ is hydrogen, X is a direct bond and $R_3$, $R_4$, $R_5$, $R_6$ and $R_7$ are each hydrogen, $R_9$ is selected from the group consisting of propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

7. A process according to claim 1, wherein $R_0$ is

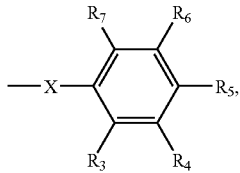

$R_1$ is

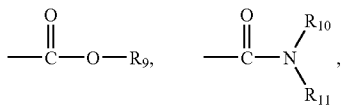

$-S-R_{12}$, $-SO-R_{12}$, $-SO_2-R_{12}$ or $-CN$ $R_2$ is hydrogen, $-S-R_{13}$, $-SO-R_{13}$, $-SO_2-R_{13}$, phenyl of

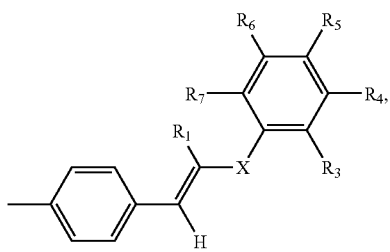

$R_3$, $R_4$, $R_5$, $R_6$ and $R_7$ independently of each other are hydrogen, $C_1$-$C_8$ alklyl, trifluoromethyl, $C_1$-$C_8$ alkoxy,

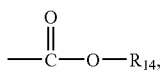

phenyl, or

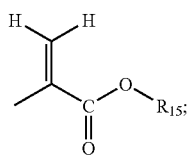

and with the proviso that at least one of the radicals from the group of $R_3$ to $R_7$ is hydrogen;

$R_9$ is $C_1$-$C_{18}$ alkyl, $C_7$-$C_9$ phenylalkyl, cyclohexyl,

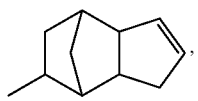 , 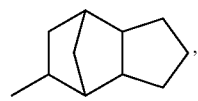 ,

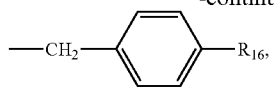

benzhydryl or

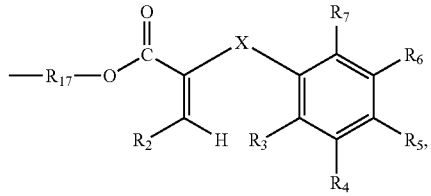

$R_{10}$ and $R_{11}$ independently of one another are hydrogen, $C_2$-$C_{10}$ alkyl, benzyl or cyclohexyl; or $R_{10}$ and $R_{11}$, together with the nitrogen atom to which they are attached, form a 5-, 6- or 7-membered heterocyclic ring;

$R_{12}$ is benzyl, phenyl or cyclohexyl, $R_{13}$ is benzyl, phenyl or cyclohexyl, $R_{14}$ is $C_1$-$C_8$ alkyl, benzyl or cyclohexyl, $R_{15}$ is $C_1C_8$ alkyl or benzyl, $R_{16}$ is

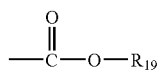

or nitro, $R_{17}$ is $C_2$-$C_{12}$ alklylene, $C_4$-$C_{12}$ alkylene which is interrupted by oxygen, cyclohexylene or phenylene, $R_{19}$ is $C_1$-$C_8$ alkyl or benzyl, X is a direct bond, $-SO-$ or $-SO_2-$ and when $R_1$ is

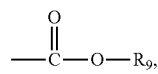

$R_2$ is hydrogen, X is a direct bond and $R_3$, $R_4$, $R_5$, $R_6$ and $R_7$ are each hydrogen, $R_9$ is selected from the group consisting of propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

8. A process according to claim 1, wherein
$R_0$ is

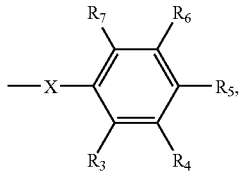

$R_1$ is

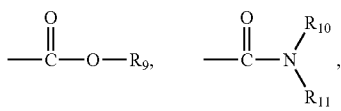

—S—$R_{12}$, —SO—$R_{12}$, $SO_2 R_{12}$ or —CN
$R_2$ is hydrogen, —SO—$R_{13}$, —$SO_2R_{13}$, phenyl or benzhydryl or

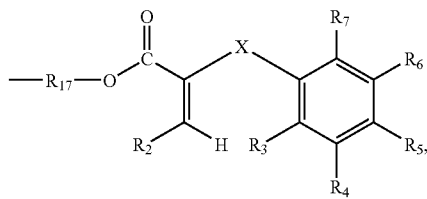

$R_{10}$ and $R_{11}$ independently of one another are hydrogen, $C_4$-$C_8$ alkyl, benzyl or cyclohexyl; or $R_{10}$ and $R_{11}$, together with the nitrogen atom to which they are attached, form a 5- or 6-membered heterocyclic ring
$R_{12}$ is phenyl,
$R_{13}$ is phenyl,
$R_{14}$ is $C_1$-$C_4$ alkyl,
$R_{15}$ is $C_1$-$C_4$ alkyl,
$R_{16}$ is

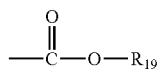

or nitro,
$R_{17}$ is $C_2$-$C_8$ alkylene,
$R_{19}$ is $C_1$-$C_4$ alkyl,
X is a direct bond or —SO— and
when $R_1$ is

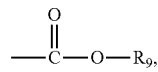

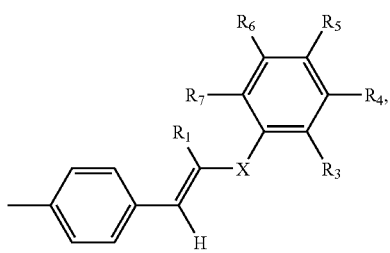

$R_3$ is hydrogen,
$R_4$ is hydrogen,
$R_5$ is hydrogen, trifluoromethyl,

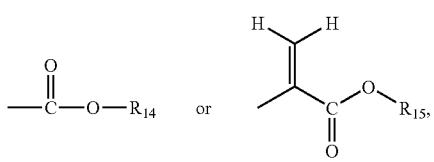

$R_6$ is hydrogen,
$R_7$ is hydrogen,
$R_9$ is $C_1$-$C_{18}$ alkyl, benzyl, phenylethyl, cyclohexyl,

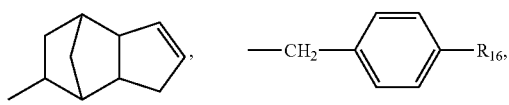

$R_2$ is hydrogen, X is a direct bond and $R_3$, $R_4$, $R_5$, $R_6$ and $R_7$ are each hydrogen, $R_9$ is selected from the group consisting of propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

9. A process according to claim 1, where the organic material is a polyurethane.

10. A process according to claim 1, where the organic material is a polyacetal or a polycarbonate.

11. A process according to claim 1, where the organic material is selected from the group consisting of polypropylene, polyethylene and ethylene/propylene copolymers.

12. A process according to claim 1, in which the compound of the formula is present in an amount of from 0.001 to 2%, based on the weight of the organic material.

13. A process according to claim 1, comprising incorporating therein or applying thereto an organic phosphite or phosphonite.

14. A process according to claim 13, comprising incorporating therein or applying thereto a phenolic antioxidant or a light stabilizer.

15. A process according to claim 1 wherein the stabilization of the organic material takes place during processing of the organic material.

16. A process according to claim 1 where the organic material is a lubricant.

17. A process according to claim 1 where the organic material is a polyester.

* * * * *